US009197493B2

(12) United States Patent
Holness et al.

(10) Patent No.: US 9,197,493 B2
(45) Date of Patent: Nov. 24, 2015

(54) PROTECTION SYSTEMS AND METHODS FOR HANDLING MULTIPLE FAULTS AND ISOLATED NODES IN INTERCONNECTED RING NETWORKS

(75) Inventors: Marc Holness, Ottawa-Legget (CA); Gerald Smallegange, Stittsville (CA); Brett Caldwell, Nepean (CA)

(73) Assignee: Ciena Corporation, Hanover, MD (US)

( * ) Notice: Subject to any disclaimer, the term of this patent is extended or adjusted under 35 U.S.C. 154(b) by 560 days.

(21) Appl. No.: 13/605,518

(22) Filed: Sep. 6, 2012

(65) Prior Publication Data
US 2014/0064063 A1 Mar. 6, 2014

(51) Int. Cl.
*G01R 31/08* (2006.01)
*H04L 12/24* (2006.01)
*H04L 29/14* (2006.01)

(52) U.S. Cl.
CPC ............ *H04L 41/0659* (2013.01); *H04L 29/14* (2013.01)

(58) Field of Classification Search
CPC ......... H04L 29/14; H04L 12/26; H04L 12/56; H04L 12/24; H04L 12/28; H04L 41/0659; H04L 6/81; G01R 31/08; G06F 15/173
USPC ......... 370/216–228, 242, 258, 389, 401, 400, 370/256, 406
See application file for complete search history.

(56) References Cited

U.S. PATENT DOCUMENTS

| | | | |
|---|---|---|---|
| 8,018,841 B2 | 9/2011 | Holness et al. | |
| 8,064,334 B2 | 11/2011 | Zhao et al. | |
| 8,203,932 B2 | 6/2012 | Cheung et al. | |
| 8,625,410 B2 * | 1/2014 | Abdullah et al. | 370/222 |
| 2007/0268817 A1 | 11/2007 | Smallegange et al. | |
| 2008/0172497 A1 | 7/2008 | Mohan et al. | |
| 2008/0273472 A1 | 11/2008 | Bashford et al. | |
| 2009/0161562 A1 | 6/2009 | Shah et al. | |
| 2009/0168671 A1 | 7/2009 | Holness et al. | |
| 2010/0135154 A1 | 6/2010 | Cheung et al. | |
| 2010/0165834 A1 | 7/2010 | Holness et al. | |
| 2010/0165883 A1 | 7/2010 | Holness et al. | |
| 2010/0238813 A1 | 9/2010 | Allan et al. | |
| 2010/0260196 A1 | 10/2010 | Holness et al. | |
| 2010/0284413 A1 | 11/2010 | Abdullah et al. | |
| 2011/0075554 A1 | 3/2011 | Holness | |
| 2011/0261681 A1 * | 10/2011 | Wu | 370/223 |
| 2011/0299388 A1 * | 12/2011 | Wu et al. | 370/228 |
| 2012/0033666 A1 | 2/2012 | Holness et al. | |
| 2012/0092985 A1 | 4/2012 | Caird et al. | |
| 2012/0106360 A1 | 5/2012 | Sajassi et al. | |
| 2012/0155484 A1 | 6/2012 | Sergeev et al. | |

* cited by examiner

*Primary Examiner* — Hanh N Nguyen
(74) *Attorney, Agent, or Firm* — Clements Bernard PLLC; Christopher L. Bernard; Lawrence A. Baratta, Jr.

(57) ABSTRACT

The present disclosure provides protection systems and methods that provide a mechanism to identify/determine when an interconnection node has been isolated (i.e. when there is no connectivity between a pair of interconnection nodes), from a data path perspective. If/when this condition exists, actions are triggered on the subtending sub-ring that essentially perform a protection switch (which causes the subtending sub-ring nodes to cleanse their forwarding tables), and, more importantly, that remove any channel blocks on the subtending sub-ring. Extensions to the ITU-T G.8032 state machine are also provided that include support for operator command interactions (e.g. DNR, force switch, manual switch, etc.). The protection systems and methods of the present disclosure enable the reliable application of ITU-T G.8032 and the like to more complex (i.e. meshed) deployment environments, among other significant advantages.

18 Claims, 25 Drawing Sheets

| Inputs | | Row | Outputs | |
|---|---|---|---|---|
| Node State | Top Priority Request | | Actions | Next Node State |
| A (Idle) | INC Trigger | | Tx R-APS(SF, INC) Flush FDB | F (INC) |
| | R-APS(SF, INC) | | Unblock non-failed ring port Stop Tx R-APS | |
| B (Protection) | INC Trigger | | Tx R-APS(SF, INC) Flush FDB | F (INC) |
| | R-APS(SF, INC) | | Unblock non-failed ring port Stop Tx R-APS | |
| C (Manual Switch) | INC Trigger | | Tx R-APS(SF, INC) Flush FDB | F (INC) |
| | R-APS(SF, INC) | | Unblock non-failed ring port Stop Tx R-APS | |

*FIG. 7*

| Inputs | | Row | Outputs | |
|---|---|---|---|---|
| Node State | Top Priority Request | | Actions | Next Node State |
| E (Pending) | INC Trigger | | If failed ring port is already blocked<br>   Tx R-APS(SF, INC, DNF)<br>Else<br>   Block failed ring port<br>   Tx R-APS(SF, INC)<br>   Flush FDB<br>If RPL Owner node<br>   Stop WTR<br>   Stop WTB | F (INC) |
| | R-APS(SF, INC) | | Unblock non-failed ring port<br>Stop Tx R-APS<br>If RPL Owner node<br>   Stop WTR<br>   Stop WTB | |

*FIG. 8*

| Inputs | | Row | Outputs | |
|---|---|---|---|---|
| Node State | Top Priority Request | | Actions | Next Node State |
| F (INC) | Clear | 100 | No action | F |
| | FS | 101 | If requested ring port is already blocked<br>   Tx R-APS(FS, DNF)<br>Else<br>   Block requested ring port<br>   Tx R-APS(SF)<br>   Flush FDB | D (Force Switch) |
| | R-APS(FS) | 102 | Unblock ring ports<br>Stop Tx R-APS | |
| | Local SF | 103 | If failed ring port is already blocked<br>   Tx R-APS(SF, DNF)<br>   Unblock non-failed ring port<br>Else<br>   Block failed ring port<br>   Tx R-APS(SF)<br>   Unblocked non-failed ring port<br>   Flush FDB | B (Protection) |
| | Local Clear SF | 104 | Stop guard timer<br>Tx R-APS(NR)<br>If RPL Owner and Revertive mode<br>   Start WTR | E (Pending) |

*FIG. 9*

| Inputs | | Row | Outputs | |
| --- | --- | --- | --- | --- |
| Node State | Top Priority Request | | Actions | Next Node State |
| F (INC) | R-APS(SF) | 105 | Unblock ring ports<br>Stop Tx R-APS | F (INC) |
| | INC Clear | 106 | Stop guard timer<br>Tx R-APS(NR)<br>If RPL Owner and Revertive mode<br>   Start WTB | E (Pending) |
| | R-APS(SF, INC) | 107 | No Action | F (INC) |
| | R-APS(MS) | 108 | No Action | |
| | MS | 109 | No Action | |
| | WTR Expires | 110 | No Action | |
| | WTR Running | 111 | No Action | |
| | WTB Expires | 112 | No Action | |
| | WTB Running | 113 | No Action | |
| | R-APS(NR, RB) | 114 | No Action | |
| | R-APS(NR) | 115 | If RPL Owner and Revertive mode<br>   Start WTB | E (Pending) |

*FIG. 10*

PROTECTION SYSTEMS AND METHODS FOR HANDLING MULTIPLE FAULTS AND ISOLATED NODES IN INTERCONNECTED RING NETWORKS

FIELD OF THE DISCLOSURE

The present disclosure relates generally to protection systems and methods in interconnected ring networks. More specifically, the present disclosure relates to protection systems and methods for handling multiple faults and isolated nodes in interconnected ring networks, especially where current ITU-T G.8032 (Ethernet Ring Protection Switching (ERPS)) protocol specifications and the like are inadequate.

BACKGROUND OF THE DISCLOSURE

In general, current ITU-T G.8032 protocol specifications and the like do not adequately cover or address ring interconnection scenarios where an interconnection node becomes isolated by multiple faults. For example, in a network including a 100G major ring with subtending 10G and/or 1G sub-rings, multiple faults on the 100G major ring may isolate an interconnection node between the 100G major ring and/or subtending 10G and/or 1G sub-rings, resulting in the permanent disruption of end-to-end client traffic continuity—despite the fact that there is a potentially realizable alternative path through the network.

Thus, what are still needed in the art are protection systems and methods that, in such scenarios, provide a mechanism to identify/determine when an interconnection node has been isolated (i.e. when there is no connectivity between a pair of interconnection nodes), from a data path perspective. Preferably, if/when this condition exists, actions are triggered on the subtending sub-ring that essentially perform a protection switch (which causes the subtending sub-ring nodes to cleanse their forwarding tables), and, more importantly, that remove any channel blocks on the subtending sub-ring.

BRIEF SUMMARY OF THE DISCLOSURE

In various exemplary embodiments, the present disclosure provides protection systems and methods that, in fact, provide a mechanism to identify/determine when an interconnection node has been isolated (i.e. when there is no connectivity between a pair of interconnection nodes), from a data path perspective. If/when this condition exists, actions are triggered on the subtending sub-ring that essentially perform a protection switch (which causes the subtending sub-ring nodes to cleanse their forwarding tables), and, more importantly, that remove any channel blocks on the subtending sub-ring. Extensions to the ITU-T G.8032 state machine are also provided that include support for operator command interactions (e.g. DNR, force switch, manual switch, etc.). The protection systems and methods of the present disclosure enable the reliable application of ITU-T G.8032 and the like to more complex (i.e. meshed) deployment environments, among other significant advantages. This brings ITU-T G.8032 and the like into the realm of other Ethernet mesh technologies (e.g. xSTP, SPB, etc.) that do provide end-to-end client traffic continuity when an interconnection node becomes isolated by multiple faults, when physically possible. In general, the protection systems and methods of the present disclosure are implemented in any Layer 2 switching devices, such as native packet switching devices (e.g. CES SDS and SAS devices, etc.) or packet switching devices over optical (e.g. OTN, SONET/SDH, etc.) (e.g. packet optical L2 cards, etc.).

In one exemplary embodiment, the present disclosure provides a network, including: a major ring; at least one sub-ring; a plurality of nodes associated with the major ring and the at least one sub-ring, wherein the plurality of nodes include a pair of interconnection nodes that couple the major ring to the at least one sub-ring; a detection mechanism for detecting when there is a fault in data path connectivity between the pair of interconnection nodes; and a trigger mechanism for, when the fault is detected, removing a sub-ring channel block in at least one of the interconnection nodes such that end-to-end client traffic connectivity is restored through the major ring and the at least one sub-ring. The detection mechanism includes CCMs exchanged between the interconnection nodes. More specifically, the detection mechanism includes point-to-multipoint CCMs exchanged between the interconnection nodes. The trigger mechanism includes, in part, an Ethernet ring protection switching protocol. The trigger mechanism also clears a forwarding table of at least one of the interconnection nodes. The sub-ring channel block is removed in at least one of the interconnection nodes by the trigger mechanism if: (1) an INC fault is detected, and (2) the interconnection node does not receive a CCM PDU comprising a sub-ring identifier that is higher than itself that contains an INC fault status. The sub-ring channel block remains/is replaced in at least one of the interconnection nodes by the trigger mechanism if: (1) an INC recovered is detected, or (2) the interconnection node receives a CCM PDU comprising a sub-ring identifier that is higher than itself that contains an INC fault status. The detection mechanism also detects when there is a prior fault in data path connectivity, thereby resulting in the subsequent fault leaving at least one of the interconnection nodes isolated by faults.

In another exemplary embodiment, the present disclosure provides a network interconnection node interconnecting a major ring and at least one sub-ring, including: a plurality of ports coupled to a plurality of other nodes in the major ring and the at least one sub-ring and at least one other interconnection node interconnecting the major ring and the at least one sub-ring; a sub-ring channel block on one of the plurality of ports, wherein the sub-ring channel block prevents data traffic from passing between the major ring and the at least one sub-ring over the port; a detection mechanism for detecting when there is a fault in data path connectivity between the network interconnection node and the at least one other interconnection node at the coupling port; and a trigger mechanism for, when the fault is detected, removing the sub-ring channel block from the blocked port such that end-to-end client traffic connectivity is restored through the major ring and the at least one sub-ring. The detection mechanism includes CCMs exchanged between the interconnection nodes. More specifically, the detection mechanism includes point-to-multipoint CCMs exchanged between the interconnection nodes. The trigger mechanism includes, in part, an Ethernet ring protection switching protocol. The trigger mechanism also clears a forwarding table of at least one of the interconnection nodes. The sub-ring channel block is removed from the blocked port if: (1) an INC fault is detected, and (2) the interconnection node does not receive a CCM PDU comprising a sub-ring identifier that is higher than itself that contains an INC fault status. The sub-ring channel block remains/is replaced at the blocked port if: (1) an INC recovered is detected, or (2) the interconnection node receives a CCM PDU comprising a sub-ring identifier that is higher than itself that contains an INC fault status. The detection mechanism also detects when there is a prior fault in data path connectivity, thereby resulting in the subsequent fault leaving at least one of the interconnection nodes isolated by faults.

In a further exemplary embodiment, the present disclosure provides a network method, including: utilizing a major ring; utilizing at least one sub-ring; utilizing a plurality of nodes associated with the major ring and the at least one sub-ring, wherein the plurality of nodes comprise a pair of interconnection nodes that couple the major ring to the at least one sub-ring; utilizing a detection mechanism for detecting when there is a fault in data path connectivity between the pair of interconnection nodes; and utilizing a trigger mechanism for, when a fault is detected, removing a sub-ring channel block in at least one of the interconnection nodes such that end-to-end client traffic connectivity is restored through the major ring and the at least one sub-ring. The trigger mechanism also clears a forwarding table of at least one of the interconnection nodes. The sub-ring channel block is removed in at least one of the interconnection nodes if: (1) an INC fault is detected, and (2) the interconnection node does not receive a CCM PDU comprising a sub-ring identifier that is higher than itself that contains an INC fault status. The sub-ring channel block remains/is replaced in at least one of the interconnection nodes if: (1) an INC recovered is detected, or (2) the interconnection node receives a CCM PDU comprising a sub-ring identifier that is higher than itself that contains an INC fault status.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a schematic diagram illustrating one exemplary embodiment of an ITU-T G.8032 protocol state machine extension that addresses the interconnection anomaly of the present disclosure;

FIG. 8 is a schematic diagram illustrating another exemplary embodiment of an ITU-T G.8032 protocol state machine extension that addresses the interconnection anomaly of the present disclosure;

FIG. 9 is a schematic diagram illustrating a further exemplary embodiment of an ITU-T G.8032 protocol state machine extension that addresses the interconnection anomaly of the present disclosure;

FIG. 10 is a schematic diagram illustrating a still further exemplary embodiment of an ITU-T G.8032 protocol state machine extension that addresses the interconnection anomaly of the present disclosure;

DETAILED DESCRIPTION OF THE DISCLOSURE

Figure 1:
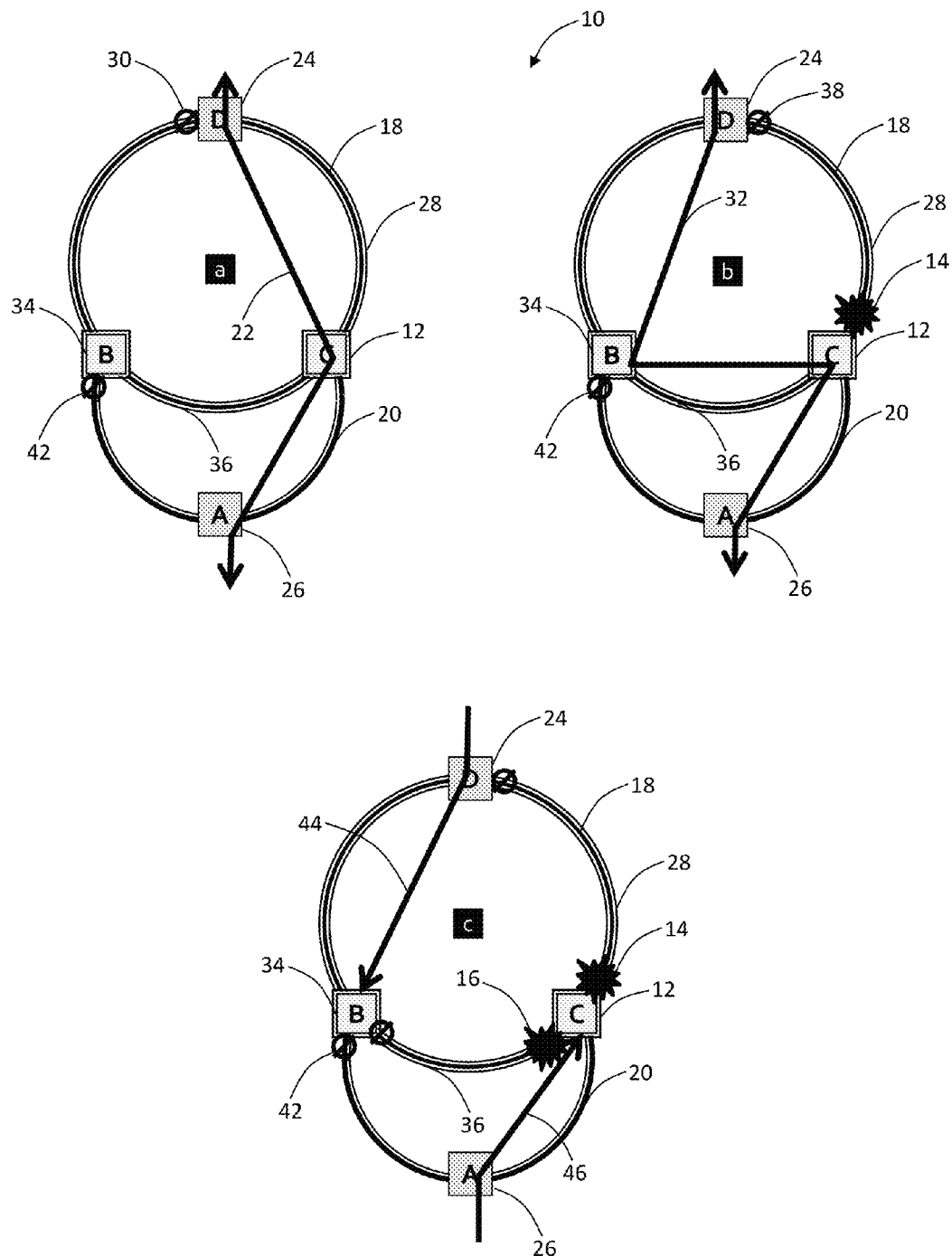
FIG. 1 is a network diagram illustrating one exemplary ring interconnection scenario where an interconnection node becomes isolated by multiple faults.

FIG. 1 is a network diagram illustrating one exemplary ring interconnection scenario 10 where an interconnection node 12 becomes isolated by multiple faults 14 and 16. In general (referring specifically to FIG. 1a), a major ring 18 is interconnected to a sub-ring 20 by a pair of interconnection nodes, B 34 and C 12. Thus, full data path connectivity 22 (through node D 24-node C 12-node A 26) is initially supported. Subsequently (referring specifically to FIG. 1b), a fault 14 occurs on the link 28 between nodes C 12 and D 24 in the major ring 18. In response, an Ethernet ring protection switching protocol is activated on the major ring 18, whereby an initially blocked port 30 on node D 24 is unblocked—thereby maintaining full data path connectivity 32 (through node D 24-node B 34-node C 12-node A 26). Subsequently (referring specifically to FIG. 1c), a second fault 16 occurs on the link 36 between nodes C 12 and B 34 in the major ring 18. This effectively leaves nodes D 24 and B 34 with blocked ports 38 and 40, respectively, relative to node C 12 in the major ring 18. In response, an Ethernet ring protection switching protocol is again activated on the major ring 18, however, this time, node C 12 is essentially isolated and full data path connectivity 22 or 32 (through node D 24-node C 12-node A 26 or node D 24-node B 34-node C 12-node A 26, respectively) may not be maintained through it. Due to the fact that the port 42 on node B 34 that is coupled to node A 26 is blocked by default conventionally in the sub-ring 20, there is also no mechanism for node A 26 to complete a data path with node D 24 through node B 34 directly. Thus, data path connectivity is limited to (node D 24-node B 34) 44 and (node A 26-node C 12) 46. This is problematic.

Figure 2:
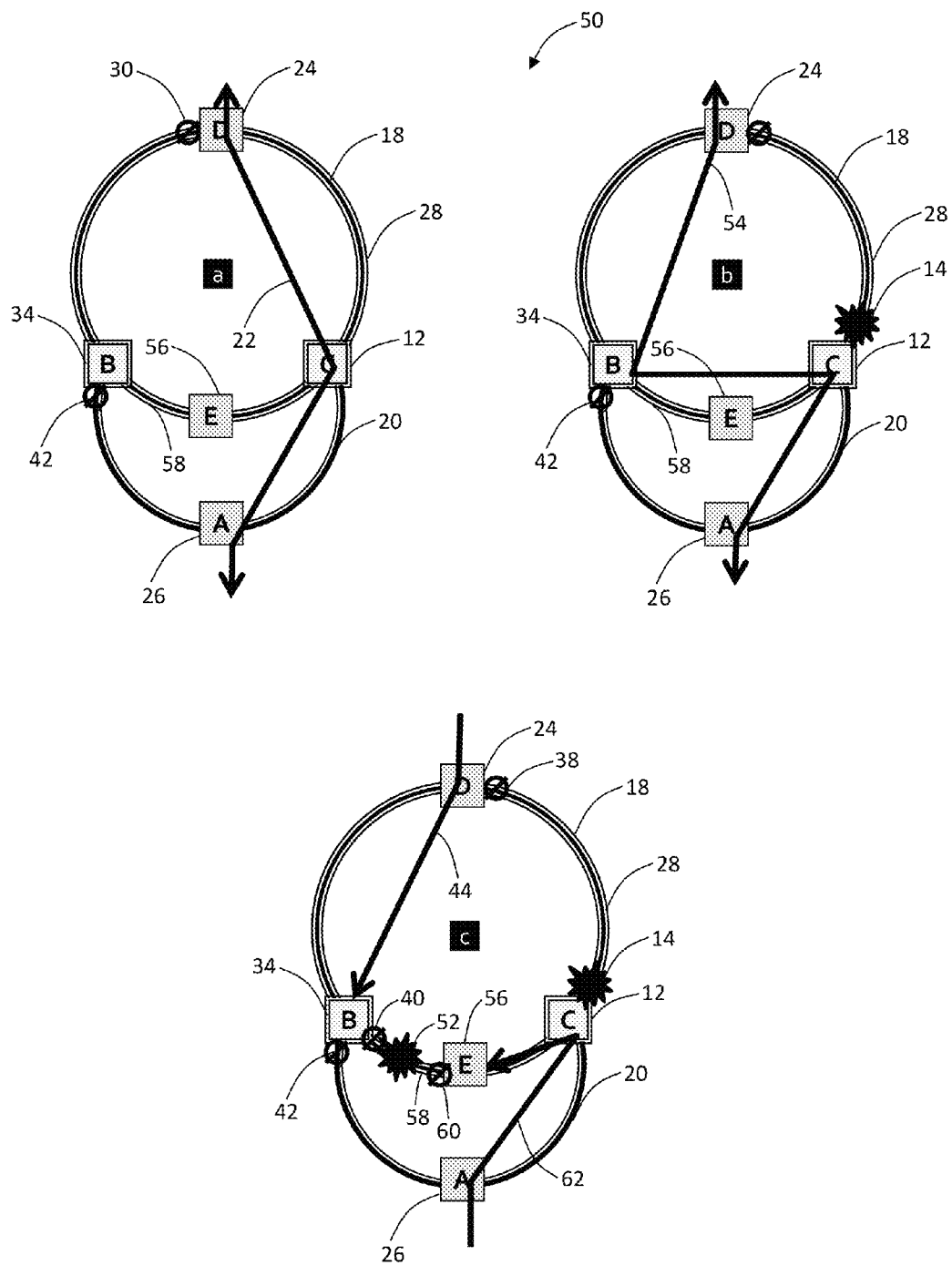
FIG. 2 is a network diagram illustrating another exemplary ring interconnection scenario where an interconnection node becomes isolated by multiple faults.

FIG. 2 is a network diagram illustrating another exemplary ring interconnection scenario 50 where an interconnection node 12 becomes isolated by multiple faults 14 and 52. In general (referring specifically to FIG. 2a), a major ring 18 is interconnected to a sub-ring 20 by a pair of interconnection nodes, B 34 and C 12. Thus, full data path connectivity 22 (through node D 24-node C 12-node A 26) is initially supported. Subsequently (referring specifically to FIG. 2b), a fault 14 occurs on the link 28 between nodes C 12 and D 24 in the major ring 18. In response, an Ethernet ring protection switching protocol is activated on the major ring 18, whereby an initially blocked port 30 on node D 24 is unblocked—thereby maintaining full data path connectivity 54 (through node D 24-node B 34-node E 56-node C 12-node A 26). Subsequently (referring specifically to FIG. 2c), a second fault 52 occurs on the link 58 between nodes E 56 and B 34 in the major ring 18. This effectively leaves nodes D 24, B 34, and E 56 with blocked ports 38, 40, and 60, respectively, relative to node C 12 in the major ring 18. In response, an Ethernet ring protection switching protocol is again activated on the major ring 18, however, this time, node C 12 is essentially isolated and full data path connectivity 22 or 54 (through node D 24-node C 12-node A 26 or node D 24-node B 34-node E 56-node C 12-node A 26, respectively) may not be maintained through it. Due to the fact that the port 42 on node B 34 that is coupled to node A 26 is blocked by default conventionally in the sub-ring 20, there is also no mechanism for node A 26 to complete a data path with node D 24 through node B 34 directly. Thus, data path connectivity is limited to (node D 24-node B 34) 44 and (node A 26-node C 12-node E 56) 62. Again, this is problematic.

Figure 3:
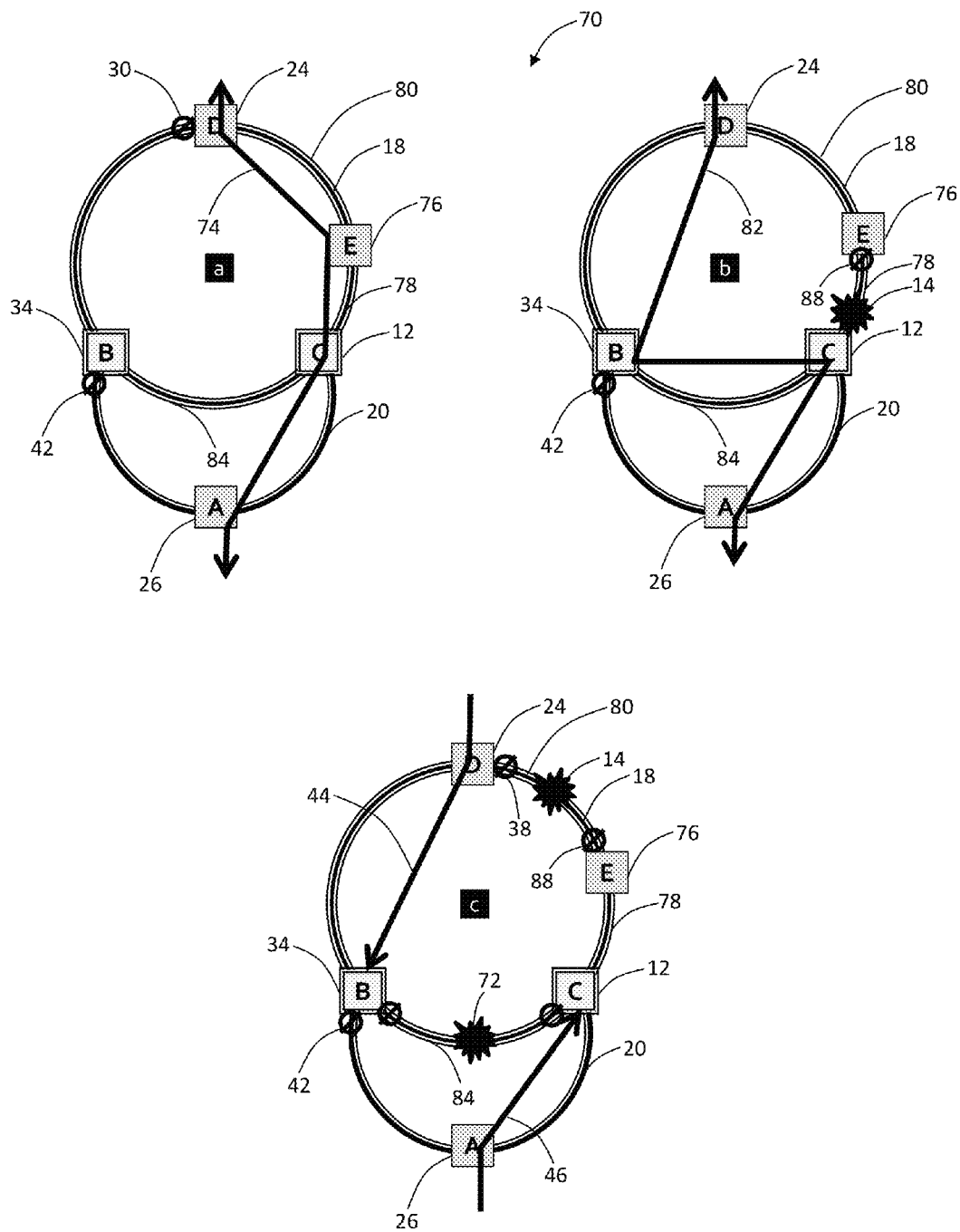
FIG. 3 is a network diagram illustrating a further exemplary ring interconnection scenario where an interconnection node becomes isolated by multiple faults.

FIG. 3 is a network diagram illustrating a further exemplary ring interconnection scenario 70 where an interconnection node 12 becomes isolated by multiple faults 14 and 72. In general (referring specifically to FIG. 3a), a major ring 18 is interconnected to a sub-ring 20 by a pair of interconnection nodes, B 34 and C 12. Thus, full data path connectivity 74 (through node D 24-node E 76-node C 12-node A 26) is initially supported. Subsequently (referring specifically to FIG. 3b), a fault 14 occurs on the link 78 between nodes C 12 and E 76 in the major ring 18, or, equivalently, on the link 80 between nodes E 76 and D 24 in the major ring 18. In response, an Ethernet ring protection switching protocol is activated on the major ring 18, whereby an initially blocked port 30 on node D 24 is unblocked—thereby maintaining full data path connectivity 82 (through node D 24-node B 34-node C 12-node A 26). Subsequently (referring specifically to FIG. 3c), a second fault 72 occurs on the link 84 between nodes C 12 and B 34 in the major ring 18. This effectively leaves nodes D 24, B 34, C 12, and E 56 with blocked ports 38, 40, 86, and 88, respectively, relative to node C 12 in the major ring 18. In response, an Ethernet ring protection switching protocol is again activated on the major ring 18, however, this time, node C 12 is essentially isolated and full data path connectivity 74 or 82 (through node D 24-node E 76-node C 12-node A 26 or node D 24-node B 34-node C 12-node A 26, respectively) may not be maintained through it. Due to the fact that the port 42 on node B 34 that is coupled to node A 26 is blocked by default conventionally in the sub-ring 20, there is also no mechanism for node A 26 to complete a data path with node D 24 through node B 34 directly. Thus, data path connectivity is limited to (node D 24-node B 34) 44 and (node A 26-node C 12) 46. Again, this is problematic.

Figure 4:
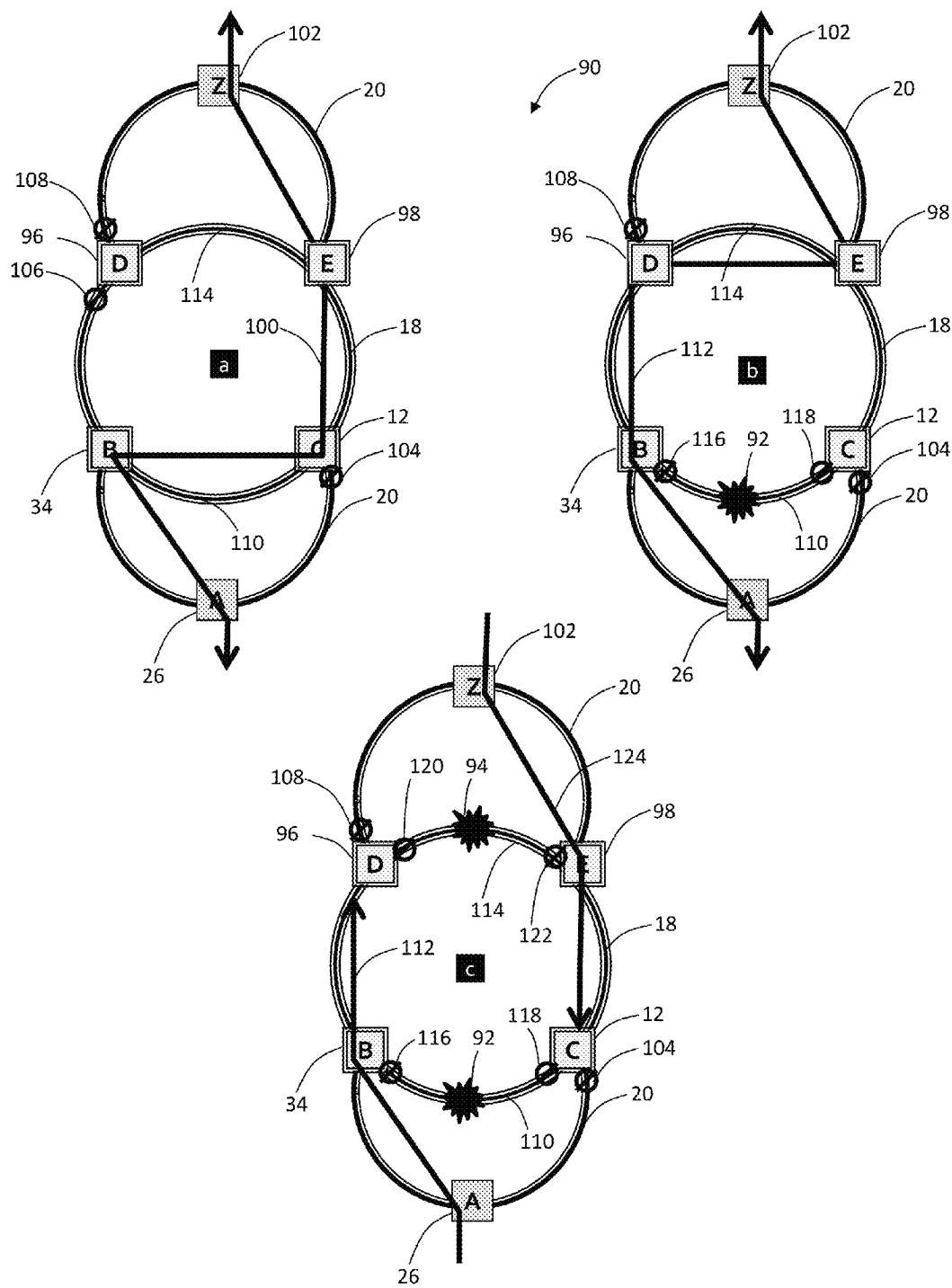
FIG. 4 is a network diagram illustrating a still further exemplary ring interconnection scenario where an interconnection node becomes isolated by multiple faults.

FIG. 4 is a network diagram illustrating a still further exemplary ring interconnection scenario 90 where interconnection nodes 12 and 96 become isolated by multiple faults 92 and 94. In general (referring specifically to FIG. 4a), a major ring 18 is interconnected to a pair of sub-rings 20, each by a pair of interconnection nodes, B 34 and C 12, and D 96 and E 98, respectively. Thus, full data path connectivity 100 (through node Z 102-node E 98-node C 12-node B 34-node A 26) is initially supported. There are conventional port blocks 104, 106, and 108 between the major ring 18 and a sub-ring 20 at node C 12, within the major ring 18 at node D 96, and between the major ring 18 and a sub-ring 20 also at node D 96, respectively. Subsequently (referring specifically to FIG. 4b), a fault 92 occurs on the link 110 between nodes C 12 and B 34 in the major ring 18. In response, an Ethernet ring protection switching protocol is activated on the major ring 18, whereby the initially blocked port 106 on node D 96 is unblocked—thereby maintaining full data path connectivity 112 (through node Z 102-node E 98-node D 96-node B 34-node A 26). Subsequently (referring specifically to FIG. 4c), a second fault 94 occurs on the link 114 between nodes D 96 and E 98 in the major ring 18. This effectively leaves nodes B 34, C 12, D 96, and E 98 with blocked ports 116, 118, 120, and 122, respectively, relative to nodes C 12 and D 96 in the major ring 18. In response, an Ethernet ring protection switching protocol is again activated on the major ring 18, however, this time, nodes C 12 and D 96 are essentially isolated and full data path connectivity 100 or 112 (through node Z 102-node E 98-node C 12-node B 34-node A 26 or node Z 102-node E 98-node D 96-node B 34-node A 26, respectively) may not be maintained through them. Due to the fact that the port 104 on node C 12 that is coupled to node A 26 and the port 108 on node D 96 that is coupled to node Z 102 are blocked by default conventionally in the sub-rings 20, there are also no mechanisms for node A 26 or Z 102 to complete a data path with each other through nodes C 12 or D 96 directly. Thus, data path connectivity is limited to (node Z 102-node E 98-node C 12) 124 and (node A 26-node B 34-node D 96) 126. This is again problematic.

Figure 5:
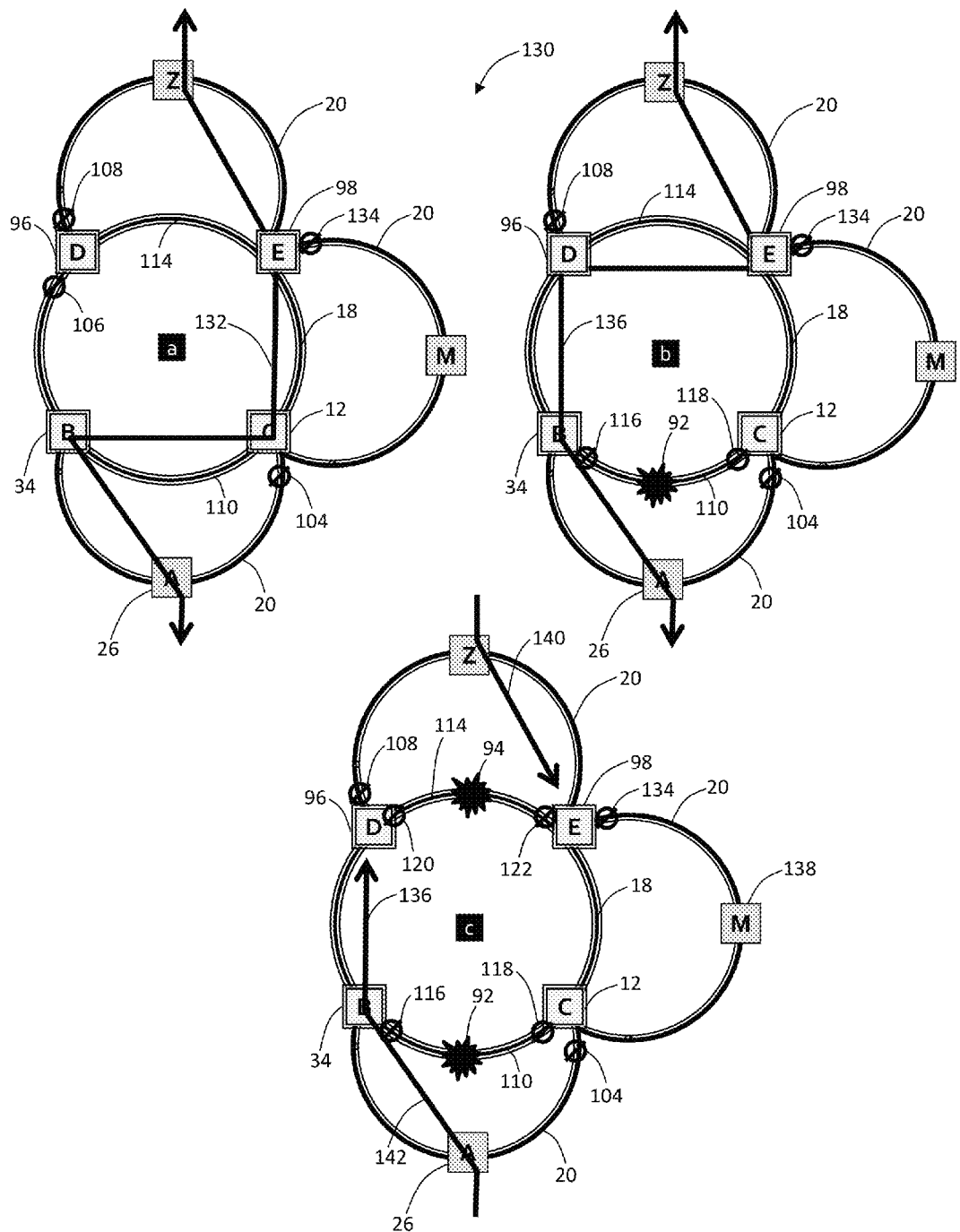
FIG. 5 is a network diagram illustrating a still further exemplary ring interconnection scenario where an interconnection node becomes isolated by multiple faults.

Finally, FIG. 5 is a network diagram illustrating a still further exemplary ring interconnection scenario 130 where interconnection nodes 12, 96, and 98 become isolated by multiple faults 92 and 94. In general (referring specifically to FIG. 5a), a major ring 18 is interconnected to a trio of sub-rings 20, each by a pair of interconnection nodes, B 34 and C 12, D 96 and E 98, and C 12 and E 98, respectively. Thus, full data path connectivity 132 (through node Z 102-node E 98-node C 12-node B 34-node A 26) is initially supported. There are conventional port blocks 104, 106, 108, and 134 between the major ring 18 and a sub-ring 20 at node C 12, within the major ring 18 at node D 96, between the major ring 18 and a sub-ring 20 also at node D 96, and between the major ring 18 and a sub-ring 20 at node E 98, respectively. Subsequently (referring specifically to FIG. 5b), a fault 92 occurs on the link 110 between nodes C 12 and B 34 in the major ring 18. In response, an Ethernet ring protection switching protocol is activated on the major ring 18, whereby the initially blocked port 106 on node D 96 is unblocked—thereby maintaining full data path connectivity 136 (through node Z 102- node E 98-node D 96-node B 34-node A 26). Subsequently (referring specifically to FIG. 5*c*), a second fault 94 occurs on the link 114 between nodes D 96 and E 98 in the major ring 18. This effectively leaves nodes B 34, C 12, D 96, and E 98 with blocked ports 116, 118, 120, and 122, respectively, relative to nodes C 12, D 96, and E 98 in the major ring 18. In response, an Ethernet ring protection switching protocol is again activated on the major ring 18, however, this time, nodes C 12, D 96, and E 98 are essentially isolated and full data path connectivity 132 or 136 (through node Z 102-node E 98-node C 12-node B 34-node A 26 or node Z 102-node E 98-node D 96-node B 34-node A 26, respectively) may not be maintained through them. Due to the fact that the port 104 on node C 12 that is coupled to node A 26, the port 108 on node D 96 that is coupled to node Z 102, and the port 134 on node E 98 that is coupled to node C 12 are blocked by default conventionally in the sub-rings 20, there are also no mechanisms for node A 26 or Z 102 to complete a data path with each other through nodes C 12, D 96, M 138, or E 98 directly. Thus, data path connectivity is limited to (node Z 102-node E 98) 140 and (node A 26-node B 34-node D 96) 142. This is again problematic.

The solution of the present disclosure involves identifying when data path connectivity between a pair of interconnection nodes (e.g. a sub-ring attached to a major ring) is lost. Data path connectivity between interconnection nodes is identified via standard CCM sessions between the interconnection nodes. Each pair of interconnection nodes (associated with a sub-ring) are configured with point-to-multipoint CCMs between all other interconnection nodes attached to the major ring. In other words, all interconnection nodes attached to the major ring are within the same MEG ID (i.e. maintenance association) and are configured at the same level. The MEP identifiers (used to dispatch the CCMs) at each interconnection node are unique. The CCMs (used by the interconnection nodes have a multicast DA and share a common VID. It should be noted that the CCMs are Tx by configured Down MEPs facing the ports of the major ring.

Figure 6:
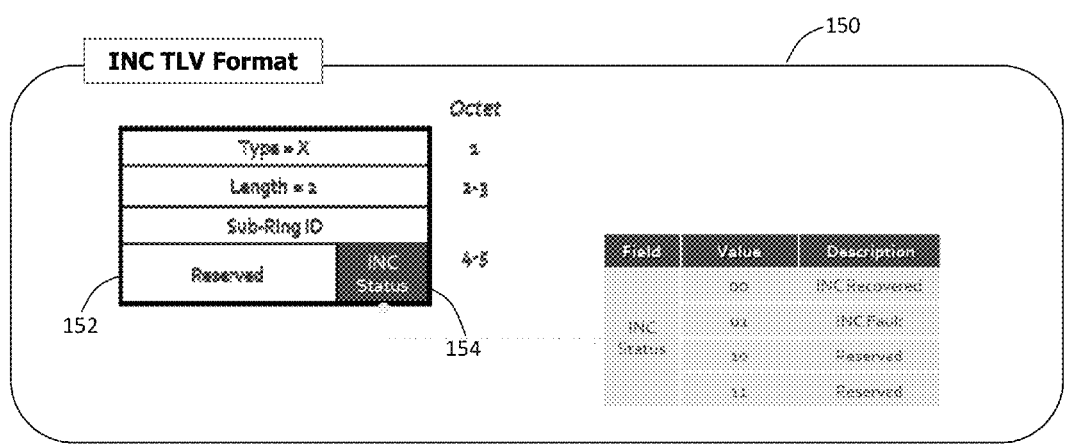
FIG. 6 is a schematic diagram illustrating one exemplary embodiment of the INC (interconnection node continuity) (type length value) format of the CCMs (continuity check messages) dispatched by the interconnection nodes of the present disclosure.

FIG. 6 is a schematic diagram illustrating one exemplary embodiment of the INC TLV format 150 of the CCMs dispatched by the interconnection nodes of the present disclosure. This INC TLV format 150 includes a value of the sub-ring identifier 152 of the attached sub-ring. If an INC fault is detected for the sub-ring being monitored by the interconnection nodes, then the INC status is set to 01. If no INC fault is detected for the sub-ring being monitored by the interconnection nodes, then the INC status is set to 00. It should be noted that potential configuration (i.e. data model) enhancements may be required to designate a unique sub-ring identifier that is attached to the major ring.

The interconnection nodes (associated with a sub-ring) trigger the sub-ring channel blocks to be removed (thus allowing end-to-end client traffic connectivity), if: (1) they detect an INC fault, and (2) they do not Rx a CCM PDU containing a sub-ring identifier that is higher than themselves that contains an INC fault status (i.e. INC status≠1). The interconnection nodes (associated with a sub-ring) will clear the INC trigger (which reverts the sub-ring back to a normal blocking state), if: (1) they detect an INC recovered, or (2) they Rx a CCM PDU containing a sub-ring identifier that is higher than themselves that contains an INC fault status (i.e. INC status≠1). The following additional R-APS request/status information is also introduced: (1) INC R-APS trigger status, (2) INC R-APS clear status, and (3) R-APS (SF, INC). FIGS. 7-10 provide ITU-T G.8032 protocol state machine extensions that are proposed to address the G.8032 interconnection anomaly of the present disclosure. Support for existing ring operational commands (e.g. do-not-revert, force switch, manual switch, etc.) are maintained.

Figure 11:
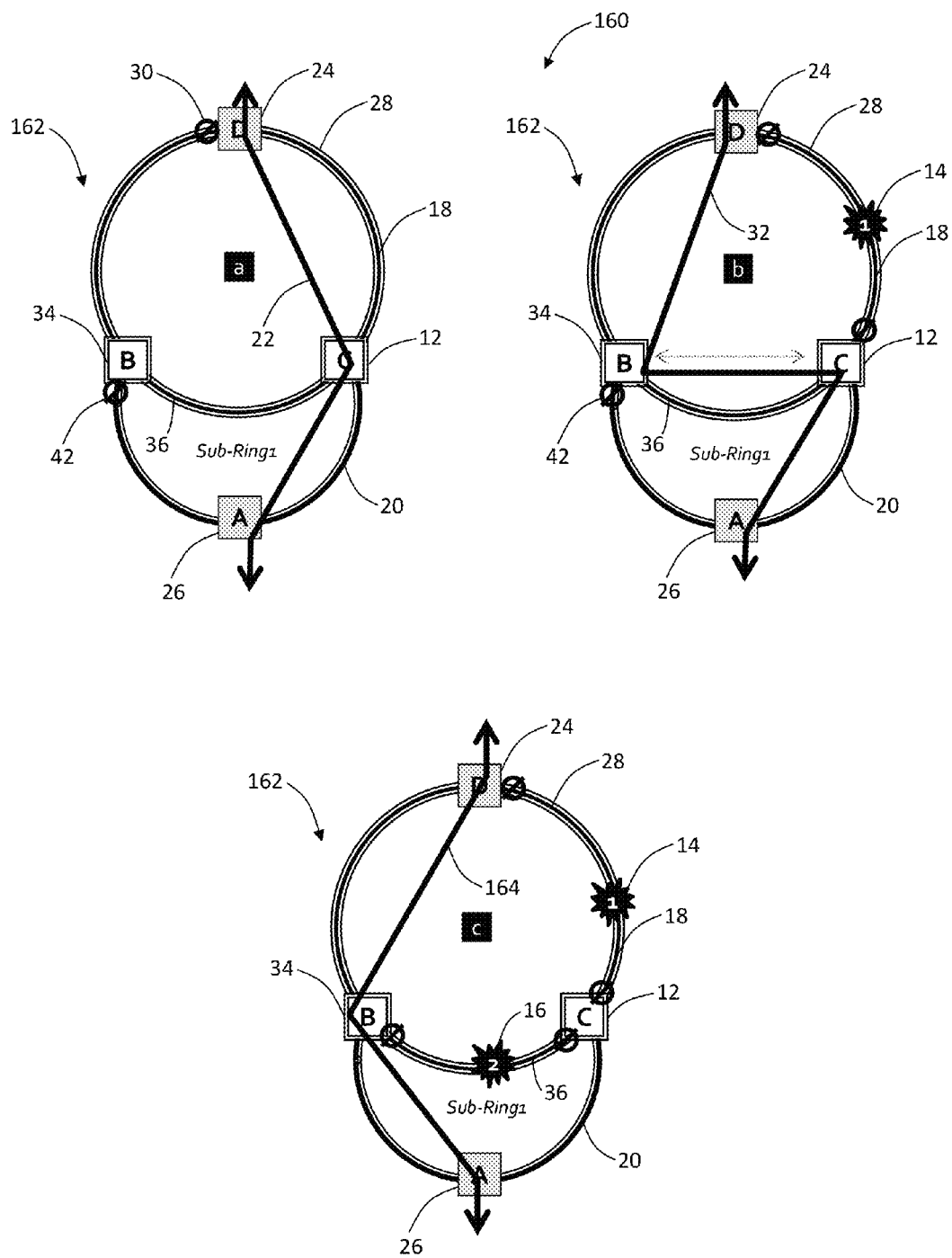
FIG. 11 is a network diagram illustrating one exemplary embodiment of the system and method for handling multiple faults and isolated nodes in an interconnected ring network of the present disclosure.

FIG. 11 is a network diagram illustrating one exemplary embodiment of the system and method 160 for handling multiple faults 14 and 16 and isolated nodes 12 in an interconnected ring network 162 of the present disclosure. In general (referring specifically to FIG. 11*a*), a major ring 18 is interconnected to a sub-ring 20 by a pair of interconnection nodes, B 34 and C 12. Thus, full data path connectivity 22 (through node D 24-node C 12-node A 26) is initially supported. Subsequently (referring specifically to FIG. 11*b*), a fault 14 occurs on the link 28 between nodes C 12 and D 24 in the major ring 18. However, interconnection node connectivity between nodes C 12 and B 34 is maintained. In response, an Ethernet ring protection switching protocol is activated on the major ring 18, whereby an initially blocked port 30 on node D 24 is unblocked—thereby maintaining full data path connectivity 32 (through node D 24-node B 34-node C 12-node A 26). Subsequently (referring specifically to FIG. 11*c*), a second fault 16 occurs on the link 36 between nodes C 12 and B 34 in the major ring 18. In response, an Ethernet ring protection switching protocol is again activated on the major ring 18, and the interconnection node connectivity disruption between nodes C 12 and B 34 is identified. In response, the conventional sub-ring channel block 42 associated with node B 34 is removed. Thus, full data path connectivity 164 (through node D 24-node B 34-node A 26) is maintained.

Figure 12:
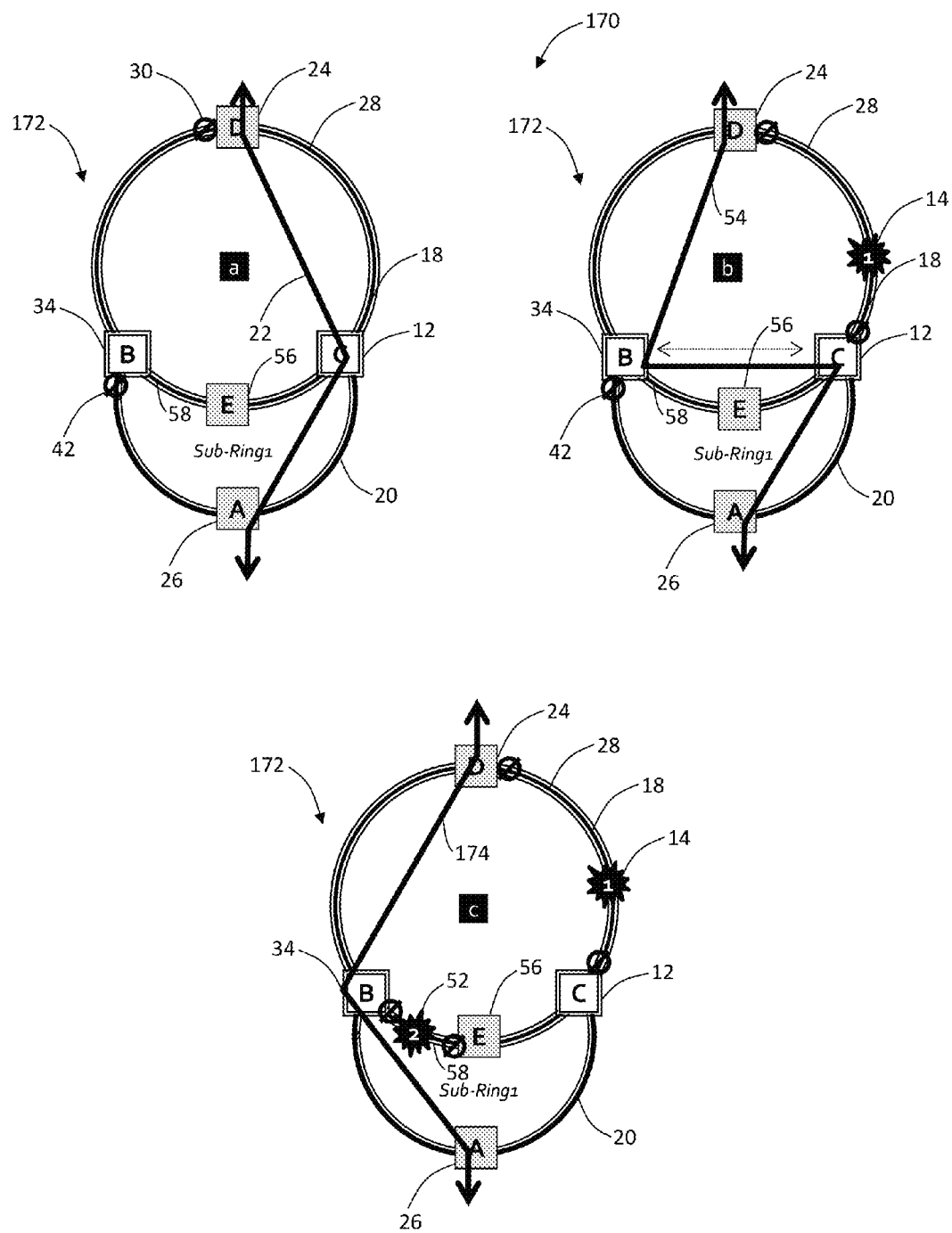
FIG. 12 is a network diagram illustrating another exemplary embodiment of the system and method for handling multiple faults and isolated nodes in an interconnected ring network of the present disclosure.

FIG. 12 is a network diagram illustrating another exemplary embodiment of the system and method 170 for handling multiple faults 14 and 52 and isolated nodes 12 and 56 in an interconnected ring network 172 of the present disclosure. In general (referring specifically to FIG. 12*a*), a major ring 18 is interconnected to a sub-ring 20 by a pair of interconnection nodes, B 34 and C 12. Thus, full data path connectivity 22 (through node D 24-node C 12-node A 26) is initially supported. Subsequently (referring specifically to FIG. 12*b*), a fault 14 occurs on the link 28 between nodes C 12 and D 24 in the major ring 18. However, interconnection node connectivity between nodes C 12 and B 34 is maintained, through node E 56. In response, an Ethernet ring protection switching protocol is activated on the major ring 18, whereby an initially blocked port 30 on node D 24 is unblocked—thereby maintaining full data path connectivity 54 (through node D 24-node B 34-node E 56-node C 12-node A 26). Subsequently (referring specifically to FIG. 12*c*), a second fault 52 occurs on the link 58 between nodes E 56 and B 34 in the major ring 18. In response, an Ethernet ring protection switching protocol is again activated on the major ring 18, and the interconnection node connectivity disruption between nodes C 12 and B 34 (and specifically between nodes E 56 and B 34) is identified. In response, the conventional sub-ring channel block 42 associated with node B 34 is removed. Thus, full data path connectivity 174 (through node D 24-node B 34-node A 26) is maintained.

Figure 13:
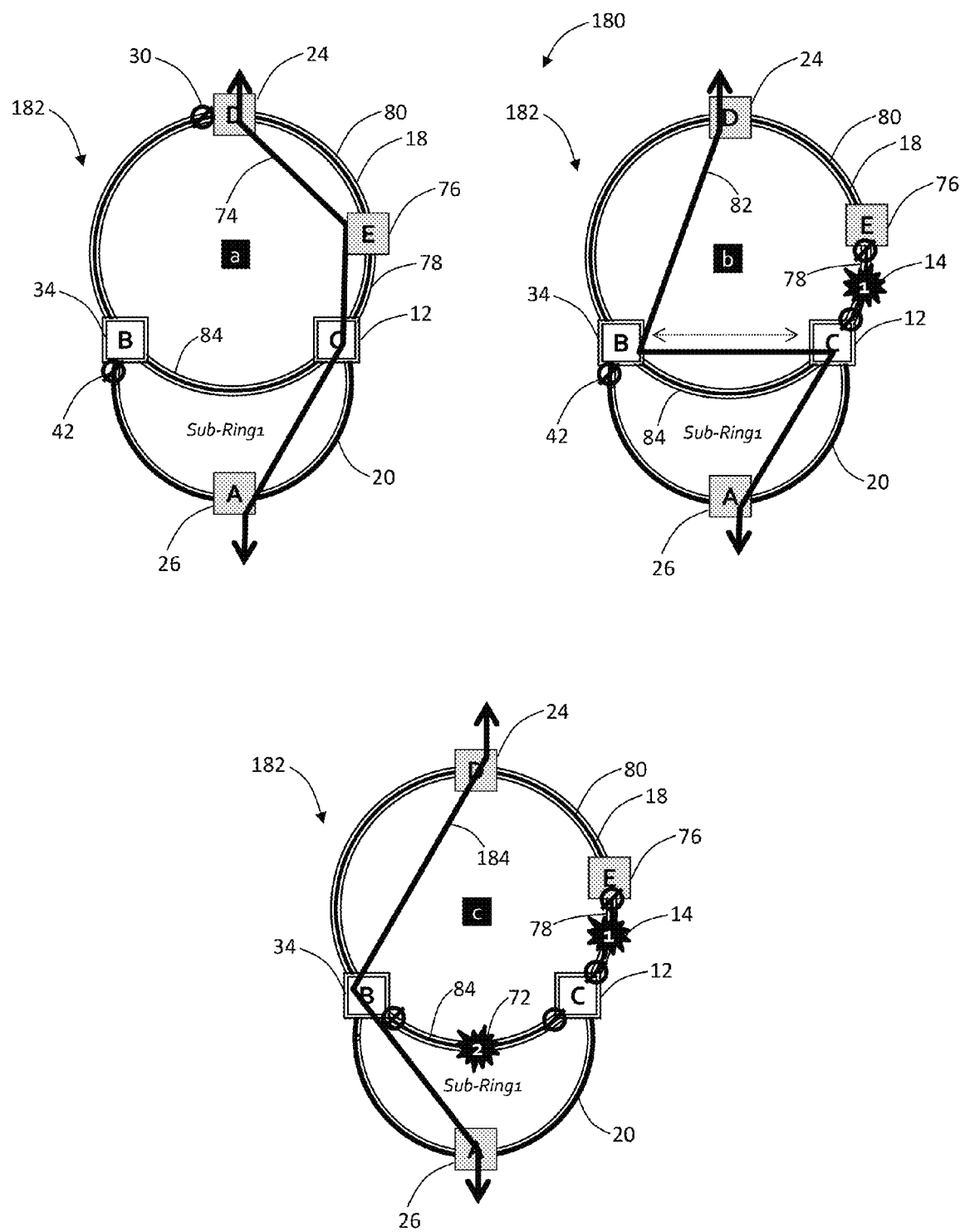
FIG. 13 is a network diagram illustrating a further exemplary embodiment of the system and method for handling multiple faults and isolated nodes in an interconnected ring network of the present disclosure.

FIG. 13 is a network diagram illustrating a further exemplary embodiment of the system and method 180 for handling multiple faults 14 and 72 and isolated nodes 12 and 76 in an interconnected ring network 182 of the present disclosure. In general (referring specifically to FIG. 13*a*), a major ring 18 is interconnected to a sub-ring 20 by a pair of interconnection nodes, B 34 and C 12. Thus, full data path connectivity 74 (through node D 24-node E 76-node C 12-node A 26) is initially supported. Subsequently (referring specifically to FIG. 13*b*), a fault 14 occurs on the link 78 between nodes C 12 and E 76 in the major ring 18, or, equivalently, on the link 80 between nodes E 76 and D 24 in the major ring 18. However, interconnection node connectivity between nodes C 12 and B 34 is maintained. In response, an Ethernet ring protection switching protocol is activated on the major ring 18, whereby an initially blocked port 30 on node D 24 is unblocked—thereby maintaining full data path connectivity 82 (through node D 24-node B 34-node C 12-node A 26). Subsequently (referring specifically to FIG. 13c), a second fault 72 occurs on the link 84 between nodes C 12 and B 34 in the major ring 18. In response, an Ethernet ring protection switching protocol is again activated on the major ring 18, and the interconnection node connectivity disruption between nodes C 12 and B 34 is identified. In response, the conventional sub-ring channel block 42 associated with node B 34 is removed. Thus, full data path connectivity 184 (through node D 24-node B 34-node A 26) is maintained.

Figure 14:
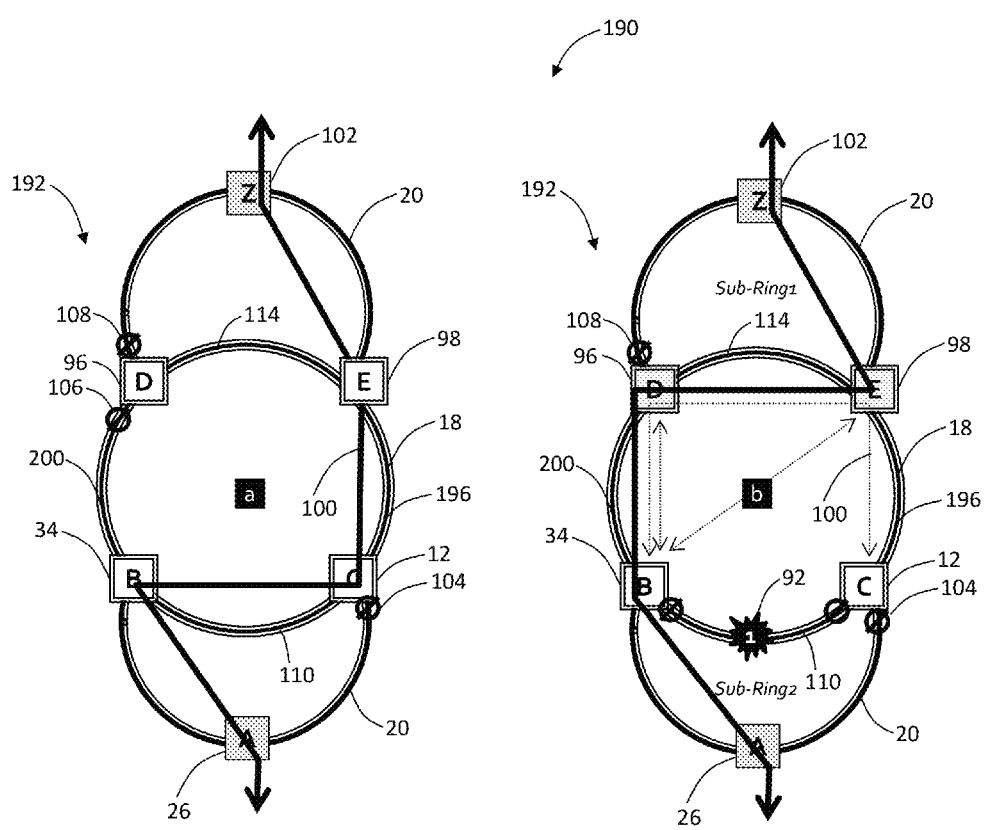
FIGS. 14 and 15 ($a, b, c1, c2$, and $c3$) are network diagrams illustrating a still further exemplary embodiment of the system and method for handling multiple faults and isolated nodes in an interconnected ring network of the present disclosure.
Figure 15:
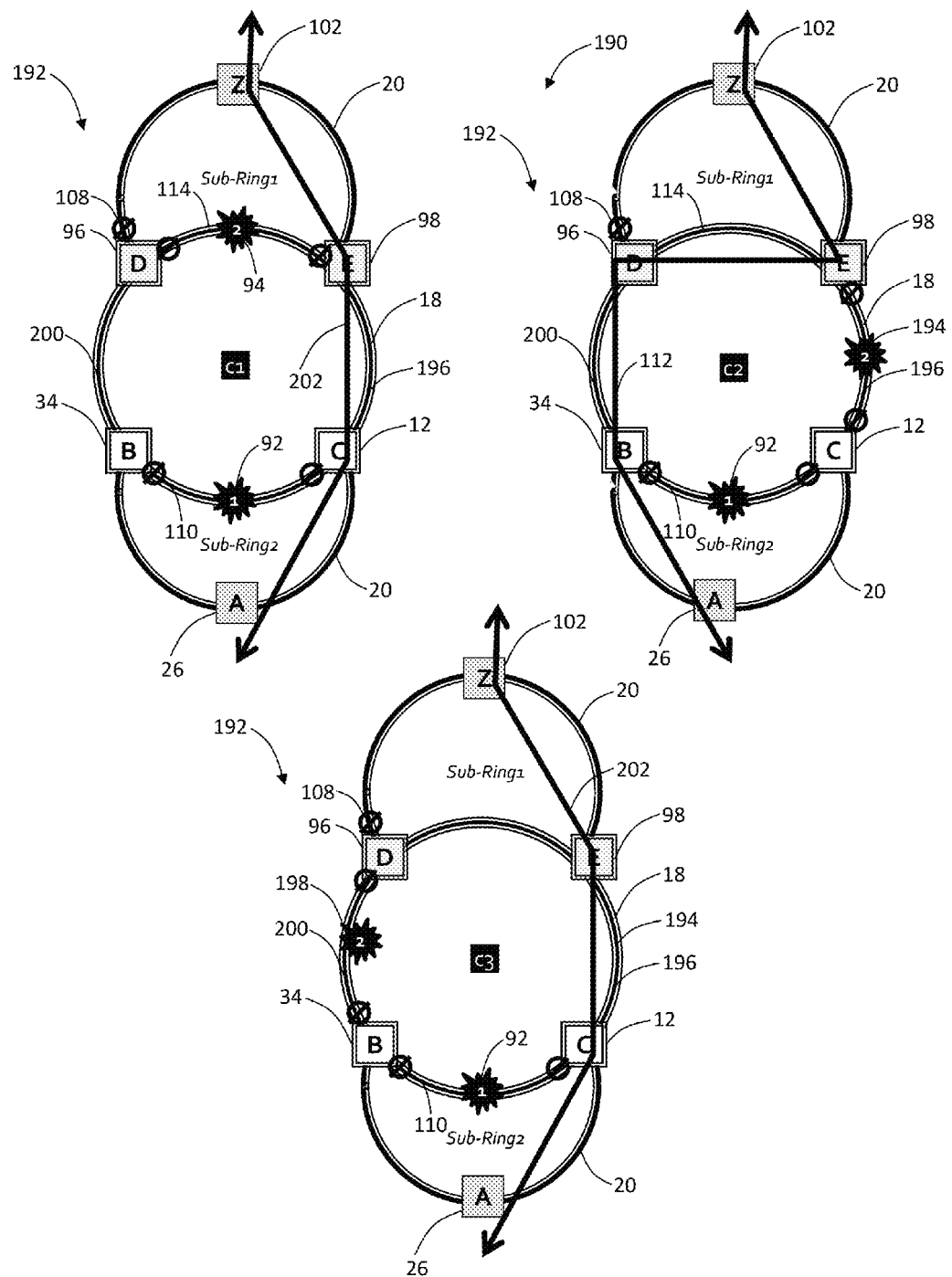

FIGS. 14 and 15 (a, b, c1, c2, and c3) are network diagrams illustrating a still further exemplary embodiment of the system and method 190 for handling multiple faults and isolated nodes in an interconnected ring network 192 of the present disclosure. In general (referring specifically to FIG. 14a), a major ring 18 is interconnected to a pair of sub-rings 20, each by a pair of interconnection nodes, B 34 and C 12, and D 96 and E 98, respectively. Thus, full data path connectivity 100 (through node Z 102-node E 98-node C 12-node B 34-node A 26) is initially supported. There are conventional port blocks 104, 106, and 108 between the major ring 18 and a sub-ring 20 at node C 12, within the major ring 18 at node D 96, and between the major ring 18 and a sub-ring 20 also at node D 96, respectively. Subsequently (referring specifically to FIG. 14b), a fault 92 occurs on the link 110 between nodes C 12 and B 34 in the major ring 18. However, interconnection node connectivity between nodes C 12 and B 34 is maintained, as well as between nodes D 96 and E 98. In response, an Ethernet ring protection switching protocol is activated on the major ring 18, whereby the initially blocked port 106 on node D 96 is unblocked—thereby maintaining full data path connectivity 112 (through node Z 102-node E 98-node D 96-node B 34-node A 26). Subsequently (referring specifically to FIGS. 15c1, 15c2, and 15c3), a second fault 94, 194, or 198 occurs on the link 114 between nodes D 96 and E 98 in the major ring 18, the link 196 between nodes C 12 and E 98 in the major ring 18, or the link 200 between nodes B 34 and D 96 in the major ring 18, respectively. In response, an Ethernet ring protection switching protocol is again activated on the major ring 18. In the case of fault 94 on link 114, an INC fault between nodes B 34 and C 12 and between nodes D 96 and E 98 is detected. However, interconnection nodes B 34 and C 12 have the higher sub-ring identifier, thus the INC mechanism is triggered and the channel block 104 is removed from the associated sub-ring 20. Thus, full data path connectivity 202 (through node Z 102-node E 98-node C 12-node A 26) is maintained. In the case of fault 194 on link 196 of the major ring 18, an Ethernet ring protection switching protocol is again activated on the major ring 18. An INC fault between nodes B 34 and C 12 is detected. However, interconnection node C 12 does not Rx a CCM (containing a sub-ring identifier higher than itself) and interconnection node B 34 does not Rx a CCM with an INC fault status identification. Consequently, the INC mechanism is triggered and the channel block 104 is removed from the associated sub-ring 20. Thus, full data path connectivity 112 (through node Z 102-node E 98-node D 96-node B 34-node A 26) is maintained. In the case of fault 198 on link 200 of the major ring 18, an Ethernet ring protection switching protocol is again activated on the major ring 18. An INC fault between nodes B 34 and C 12 is detected. However, interconnection node B 34 does not Rx a CCM (containing a sub-ring identifier higher than itself) and interconnection node C 12 does not Rx a CCM with an INC fault status identification. Consequently, the INC mechanism is triggered and the channel block 104 is removed from the associated sub-ring 20. Thus, full data path connectivity 202 (through node Z 102-node E 98-node C 12-node A 26) is maintained.

Figure 16:
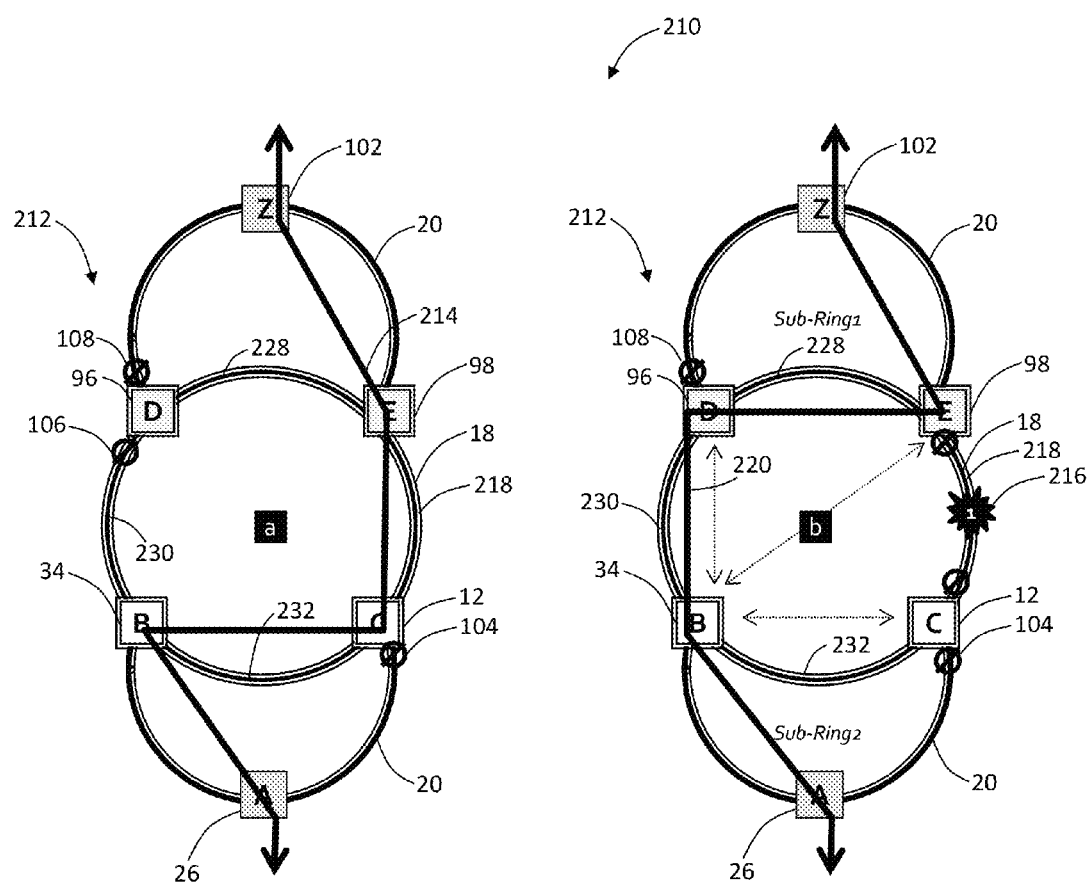
FIGS. 16 and 17 ($a, b, c1, c2$, and $c3$) are network diagrams illustrating a still further exemplary embodiment of the system and method for handling multiple faults and isolated nodes in an interconnected ring network of the present disclosure.
Figure 17:
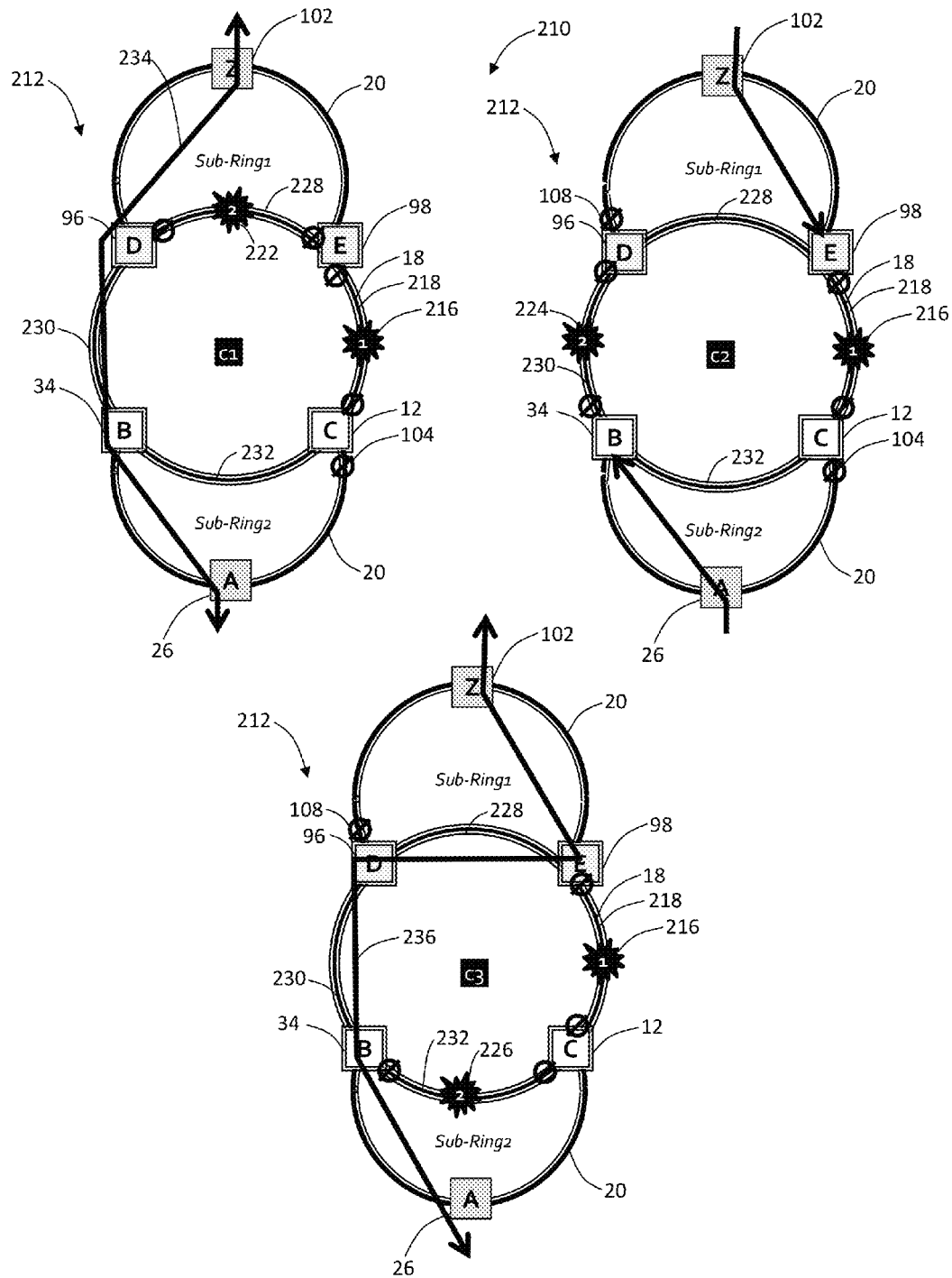

FIGS. 16 and 17 (a, b, c1, c2, and c3) are network diagrams illustrating a still further exemplary embodiment of the system and method 210 for handling multiple faults and isolated nodes in an interconnected ring network 212 of the present disclosure. In general (referring specifically to FIG. 16a), a major ring 18 is interconnected to a pair of sub-rings 20, each by a pair of interconnection nodes, B 34 and C 12, and D 96 and E 98, respectively. Thus, full data path connectivity 214 (through node Z 102-node E 98-node C 12-node B 34-node A 26) is initially supported. There are conventional port blocks 104, 106, and 108 between the major ring 18 and a sub-ring 20 at node C 12, within the major ring 18 at node D 96, and between the major ring 18 and a sub-ring 20 also at node D 96, respectively. Subsequently (referring specifically to FIG. 16b), a fault 216 occurs on the link 218 between nodes C 12 and E 98 in the major ring 18. However, interconnection node connectivity between nodes C 12 and B 34 is maintained, as well as between nodes D 96 and E 98. In response, an Ethernet ring protection switching protocol is activated on the major ring 18, whereby the initially blocked port 106 on node D 96 is unblocked—thereby maintaining full data path connectivity 220 (through node Z 102-node E 98-node D 96-node B 34-node A 26). Subsequently (referring specifically to FIGS. 17c1, 17c2, and 17c3), a second fault 222, 224, or 226 occurs on the link 228 between nodes D 96 and E 98 in the major ring 18, the link 230 between nodes B 34 and D 96 in the major ring 18, or the link 232 between nodes B 34 and C 12 in the major ring 18, respectively. In response, an Ethernet ring protection switching protocol is again activated on the major ring 18. In the case of fault 222 on link 228, an INC fault between nodes D 96 and E 98 is detected. However, interconnection node E 98 does not Rx a CCM (containing a sub-ring identifier higher than itself) and node D 96 does not Rx a CCM with an INC fault status indication. Consequently, the INC mechanism is triggered and the channel block 108 at interconnection node D 96 is removed from the associated sub-ring 20. Thus, full data path connectivity 234 (through node Z 102-node D 96-node B 34-node A 26) is maintained. In the case of fault 224 on link 230 of the major ring 18, an Ethernet ring protection switching protocol is again activated on the major ring 18. However, no INC fault is detected. The network 212 is segmented, and it is not possible to maintain full data path connectivity in this case. In the case of fault 226 on link 232 of the major ring 18, an Ethernet ring protection switching protocol is again activated on the major ring 18. An INC fault between nodes B 34 and C 12 is detected. However, interconnection node C 12 does not Rx a CCM (containing a sub-ring identifier higher than itself) and interconnection node B 34 does not Rx a CCM with an INC fault status indication. Consequently, the INC mechanism is triggered and the channel block 106 is removed from the associated sub-ring 20. Thus, full data path connectivity 236 (through node Z 102-node E 98-node D 96-node B 34-node A 26) is maintained.

Figure 18:
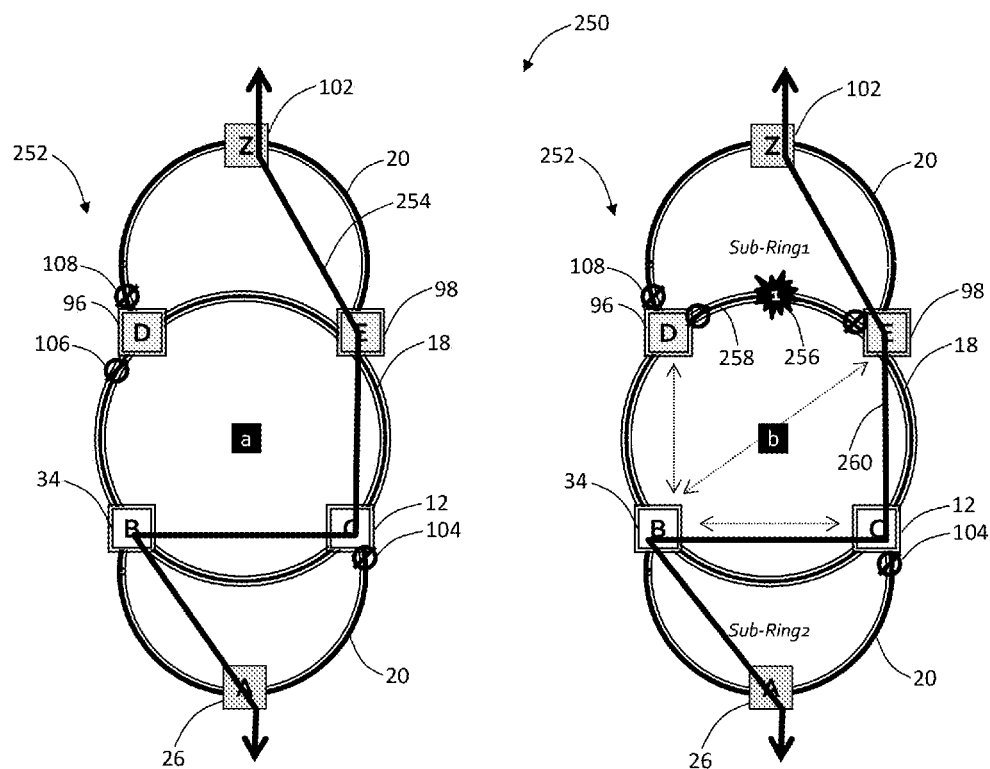
FIGS. 18 and 19 ($a, b, c1, c2$, and $c3$) are network diagrams illustrating a still further exemplary embodiment of the system and method for handling multiple faults and isolated nodes in an interconnected ring network of the present disclosure.
Figure 19:
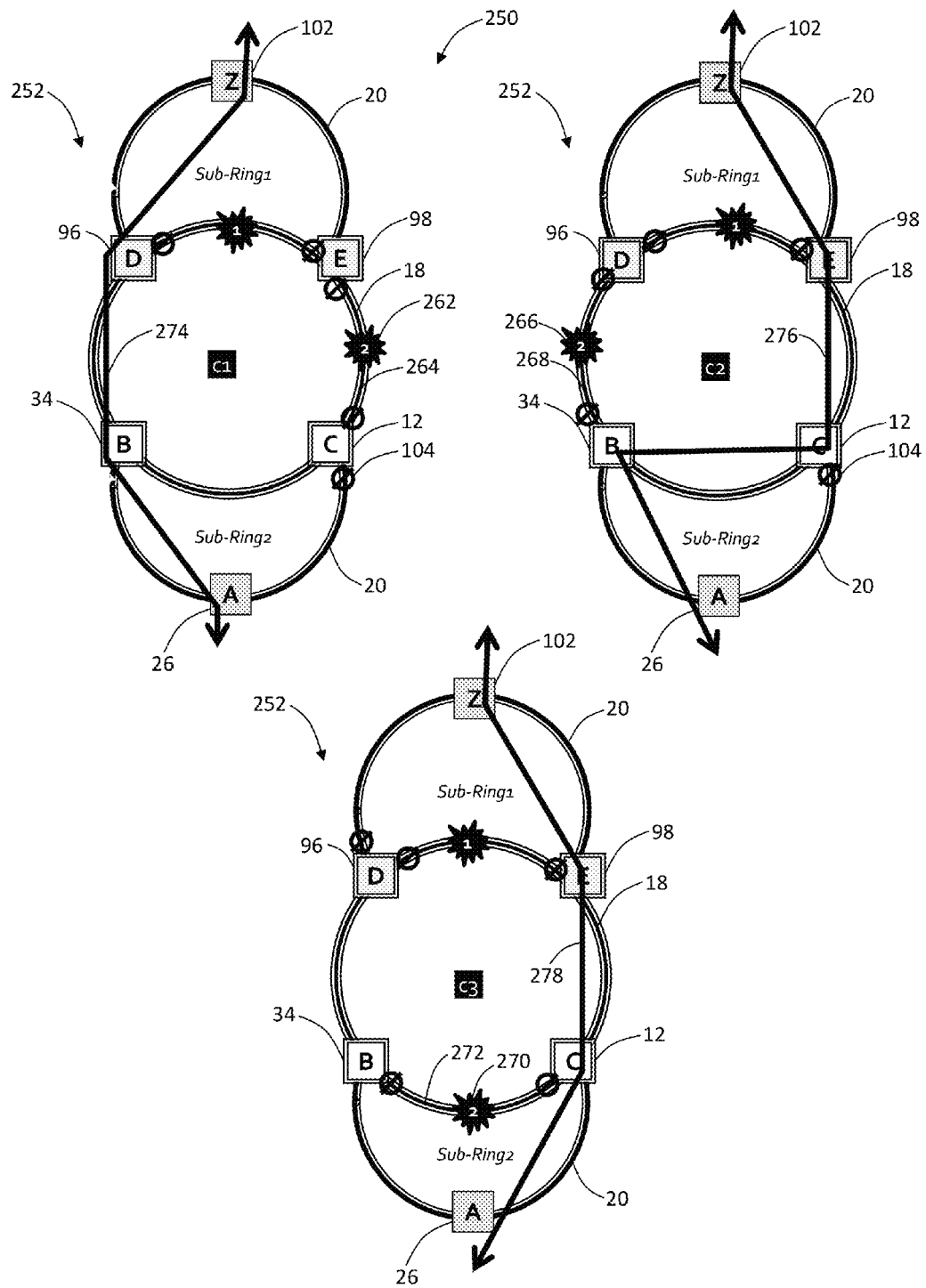

FIGS. 18 and 19 (a, b, c1, c2, and c3) are network diagrams illustrating a still further exemplary embodiment of the system and method 250 for handling multiple faults and isolated nodes in an interconnected ring network 252 of the present disclosure. In general (referring specifically to FIG. 18a), a major ring 18 is interconnected to a pair of sub-rings 20, each by a pair of interconnection nodes, B 34 and C 12, and D 96 and E 98, respectively. Thus, full data path connectivity 254

(through node Z 102-node E 98-node C 12-node B 34-node A 26) is initially supported. There are conventional port blocks 104, 106, and 108 between the major ring 18 and a sub-ring 20 at node C 12, within the major ring 18 at node D 96, and between the major ring 18 and a sub-ring 20 also at node D 96, respectively. Subsequently (referring specifically to FIG. 18*b*), a fault 256 occurs on the link 258 between nodes D 96 and E 98 in the major ring 18. However, interconnection node connectivity between nodes C 12 and B 34 is maintained, as well as between nodes D 96 and E 98. In response, an Ethernet ring protection switching protocol is activated on the major ring 18, whereby the initially blocked port 106 on node D 96 is unblocked—thereby maintaining full data path connectivity 260 (through node Z 102-node E 98-node C 12-node B 34-node A 26). Subsequently (referring specifically to FIGS. 19*c*1, 19*c*2, and 19*c*3), a second fault 262, 266, or 270 occurs on link 264, 268, or 272 in the major ring 18, respectively. In response, an Ethernet ring protection switching protocol is again activated on the major ring 18. In the case of fault 262 on link 264, an INC fault between nodes D 96 and E 98 is detected. However, interconnection node E 98 does not Rx a CCM (containing a sub-ring identifier higher than itself) and node D 96 does not Rx a CCM with an INC fault status indication. Consequently, the INC mechanism is triggered and the channel block 108 at interconnection node D 96 is removed from the associated sub-ring 20. Thus, full data path connectivity 274 (through node Z 102-node D 96-node B 34-node A 26) is maintained. In the case of fault 266 on link 268 of the major ring 18, an Ethernet ring protection switching protocol is again activated on the major ring 18. An INC fault between interconnection node D 96 and interconnection node E 98 is detected. However, interconnection node D 96 does not Rx a CCM (containing a sub-ring identifier higher than itself) and node E 98 does not Rx a CCM with an INC fault status indication. Consequently, the INC mechanism is triggered and the channel blocks 106 and 108 at interconnection node D 96 are removed from the associated sub-ring 20. Thus, full data path connectivity 276 (through node Z 102-node E 98-node C 12-node B 34-node A 26) is maintained. In the case of fault 270 on link 272 of the major ring 18, an Ethernet ring protection switching protocol is again activated on the major ring 18. An INC fault between nodes B 34 and C 12, and D 96 and E 98, is detected. However, interconnection nodes B 34 and C 12 do not Rx a CCM (containing a sub-ring identifier higher than themselves). Consequently, the INC mechanism is triggered and the channel block 104 is removed from the associated sub-ring 20. Thus, full data path connectivity 278 (through node Z 102-node E 98-node C-node A 26) is maintained.

Figure 20:
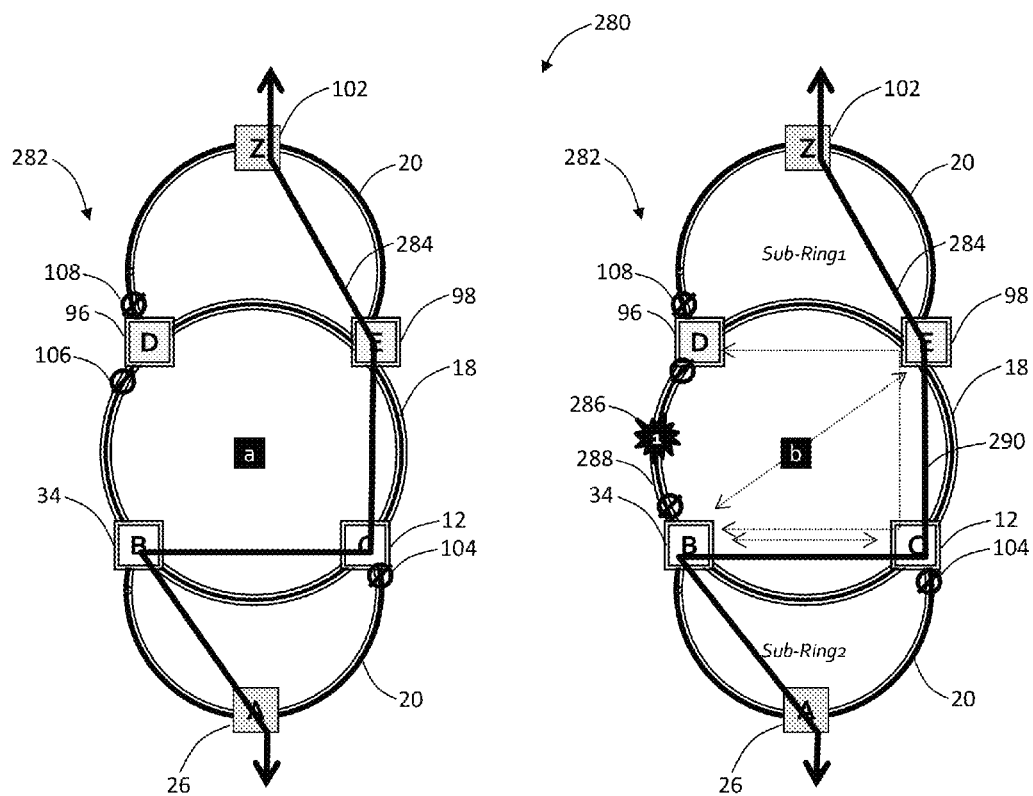
FIGS. 20 and 21 ($a, b, c1, c2$, and $c3$) are network diagrams illustrating a still further exemplary embodiment of the system and method for handling multiple faults and isolated nodes in an interconnected ring network of the present disclosure.
Figure 21:
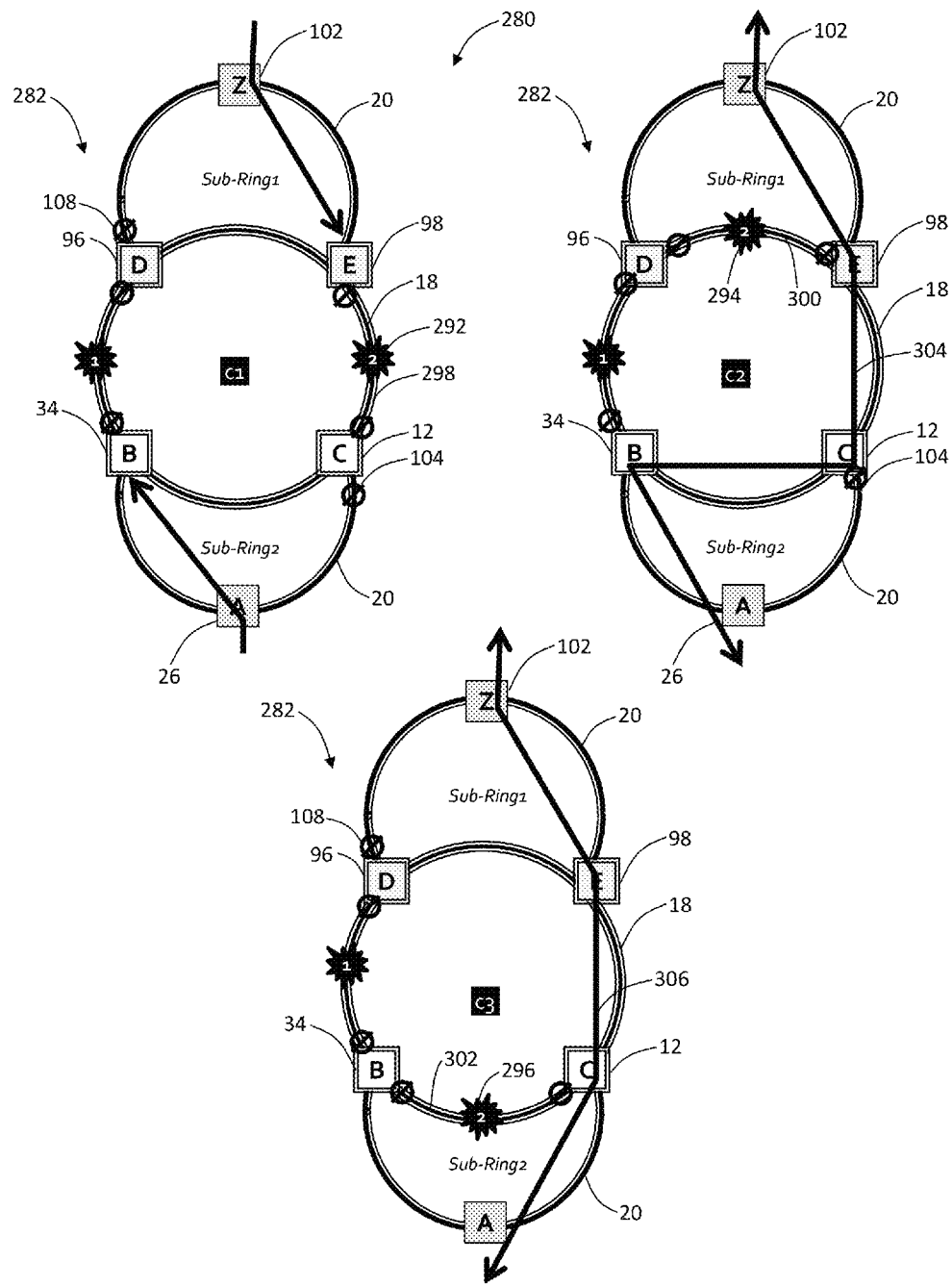

FIGS. 20 and 21 (*a, b, c*1, *c*2, and *c*3) are network diagrams illustrating a still further exemplary embodiment of the system and method 280 for handling multiple faults and isolated nodes in an interconnected ring network 282 of the present disclosure. In general (referring specifically to FIG. 20*a*), a major ring 18 is interconnected to a pair of sub-rings 20, each by a pair of interconnection nodes, B 34 and C 12, and D 96 and E 98, respectively. Thus, full data path connectivity 284 (through node Z 102-node E 98-node C 12-node B 34-node A 26) is initially supported. There are conventional port blocks 104, 106, and 108 between the major ring 18 and a sub-ring 20 at node C 12, within the major ring 18 at node D 96, and between the major ring 18 and a sub-ring 20 also at node D 96, respectively. Subsequently (referring specifically to FIG. 20*b*), a fault 286 occurs on the link 288 between nodes B 34 and D 96 in the major ring 18. However, interconnection node connectivity between nodes C 12 and B 34 is maintained, as well as between nodes D 96 and E 98. In response, an Ethernet ring protection switching protocol is activated on the major ring 18, whereby an initially blocked port is unblocked—thereby maintaining full data path connectivity 290 (through node Z 102-node E 98-node C 12-node B 34-node A 26). Subsequently (referring specifically to FIGS. 21*c*1, 21*c*2, and 21*c*3), a second fault 292, 294, or 296 occurs on link 298, 300, or 302 in the major ring 18, respectively. In response, an Ethernet ring protection switching protocol is again activated on the major ring 18. In the case of fault 292 on link 298, however, no INC fault is detected. The network 282 is segmented, and it is not possible to maintain full data path connectivity in this case. In the case of fault 294 on link 300 of the major ring 18, an Ethernet ring protection switching protocol is again activated on the major ring 18. An INC fault between interconnection node D 96 and interconnection node E 98 is detected. However, interconnection node D 96 does not Rx a CCM (containing a sub-ring identifier higher than itself) and node E 98 does not Rx a CCM (containing a sub-ring identifier higher than itself). Consequently, the INC mechanism is triggered and the channel block 108 at interconnection node D 96 is removed from the associated sub-ring 20. Thus, full data path connectivity 304 (through node Z 102-node E 98-node C 12-node B 34-node A 26) is maintained. In the case of fault 296 on link 302 of the major ring 18, an Ethernet ring protection switching protocol is again activated on the major ring 18. An INC fault between nodes B 34 and C 12 is detected. However, interconnection nodes B 34 and C 12 do not Rx a CCM (containing a sub-ring identifier higher than themselves). Consequently, the INC mechanism is triggered and the channel block 104 is removed from the associated sub-ring 20. Thus, full data path connectivity 306 (through node Z 102-node E 98-node C-node A 26) is maintained.

Figure 22:
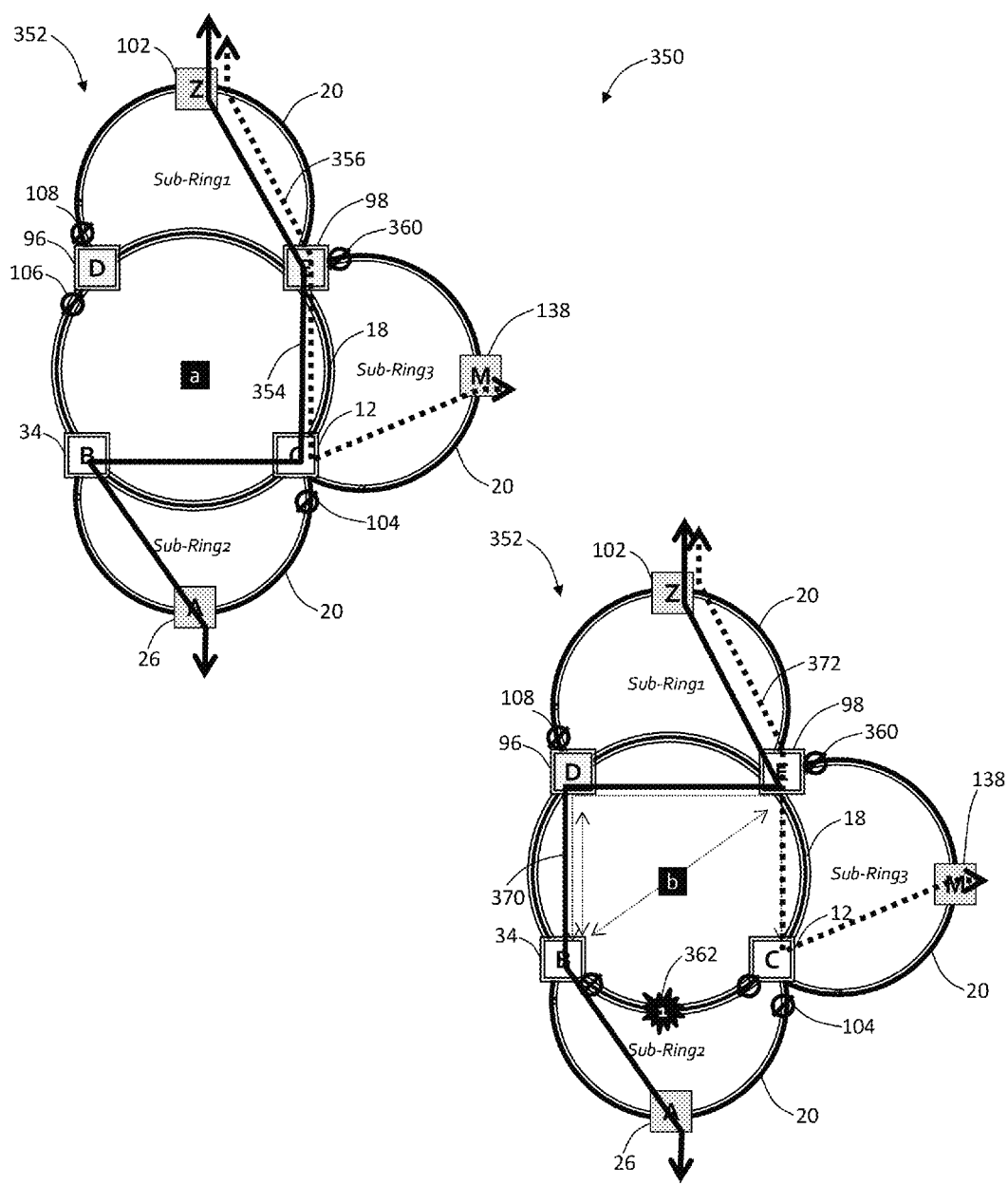
FIGS. 22 and 23 ($a, b, c1, c2$, and $c3$) are network diagrams illustrating a still further exemplary embodiment of the system and method for handling multiple faults and isolated nodes in an interconnected ring network of the present disclosure.
Figure 23:
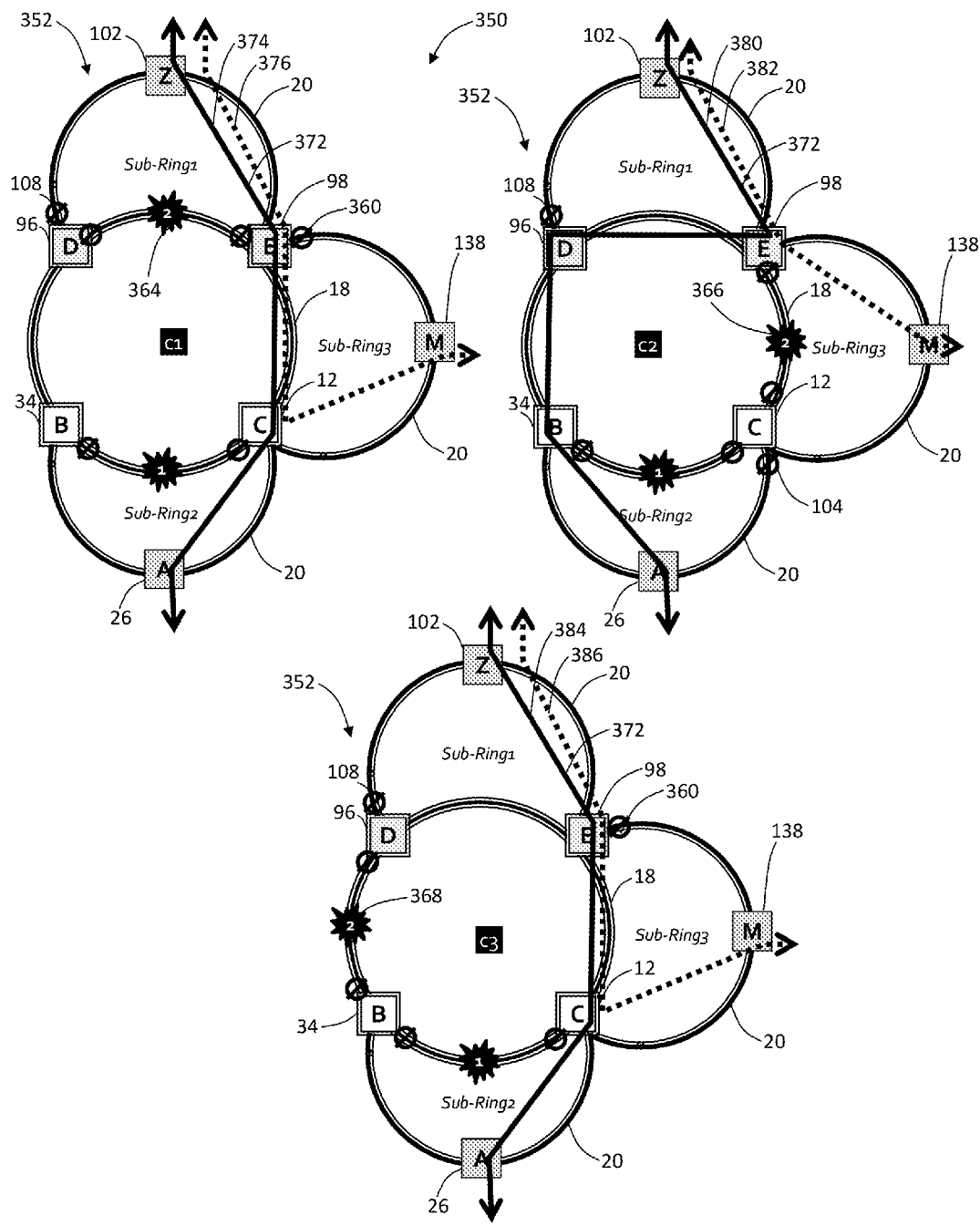

FIGS. 22 and 23 (*a, b, c*1, *c*2, and *c*3) are network diagrams illustrating a still further exemplary embodiment of the system and method 350 for handling multiple faults and isolated nodes in an interconnected ring network 352 of the present disclosure. In general (referring specifically to FIG. 22*a*), a major ring 18 is interconnected to a trio of sub-rings 20, each by a pair of interconnection nodes, B 34 and C 12, D 96 and E 98, and C 12 and E 98, respectively. Thus, full data path connectivity 354 (through node Z 102-node E 98-node C 12-node B 34-node A 26) and 356 (through node Z 102-node E 98-node C 12-node M 138) is initially supported. There are conventional port blocks 104, 106, 108, and 360 between the major ring 18 and a sub-ring 20 at node C 12, within the major ring 18 at node D 96, between the major ring 18 and a sub-ring 20 also at node D 96, and between the major ring 18 and a sub-ring 20 at node E 98, respectively. Subsequently (referring specifically to FIG. 22*b*), a fault 362 occurs on the link between nodes B 34 and C 12 in the major ring 18. However, interconnection node connectivity between nodes C 12 and B 34 is maintained, as well as between nodes D 96 and E 98, and between nodes C 12 and E 98. In response, an Ethernet ring protection switching protocol is activated on the major ring 18—thereby maintaining full data path connectivity 370 (through node Z 102-node E 98-node D 96-node B 34-node A 26) and 372 (through node Z 102-node E 98-node C 12-node M 138). Subsequently (referring specifically to FIGS. 23*c*1, 23*c*2, and 23*c*3), a second fault 364, 366, or 368 occurs on a link in the major ring 18. In the case of fault 364, an Ethernet ring protection switching protocol is again activated on the major ring 18. INC faults between nodes B 34 and C 12, and nodes D 96 and E 98, are detected. However, interconnection nodes B 34 and C 12 do not Rx a CCM (containing a sub-ring identifier higher than themselves). Consequently, the INC mechanism is triggered and the channel block 104 is removed from the associated sub-ring 20. Thus, full data path connectivities 374 (through node Z 102-node E 98-node C 12-node A 26) and 376 (through node Z 102-node E 98-node C 12-node M 138) are maintained. In the case of fault 366, an Ethernet ring protection switching protocol is again activated on the major ring 18. INC faults between nodes B 34 and C 12, and nodes D 96 and E 98, are detected. However, interconnection nodes C 12 and E 98 do not Rx a CCM (containing a sub-ring identifier higher than themselves). Consequently, the INC mechanism is triggered and the channel block 360 is removed from the associated sub-ring 20. Thus, full data path connectivities 380 (through node Z 102-node E 98-node D 96-node B 34-node A 26) and 382 (through node Z 102-node E 98-node M 138) are maintained. In the case of fault 368, an Ethernet ring protection switching protocol is again activated on the major ring 18. An INC fault between nodes B 34 and C 12 is detected. However, interconnection nodes B 34 and C 12 do not Rx a CCM with an INC fault indication (containing a sub-ring identifier higher than themselves). Consequently, the INC mechanism is triggered and the channel block 104 is removed from the associated sub-ring 20. Thus, full data path connectivities 384 (through node Z 102-node E 98-node C 12-node A 26) and 386 (through node Z 102-node E 98-node C 12-node M 138) are maintained.

Figure 24:
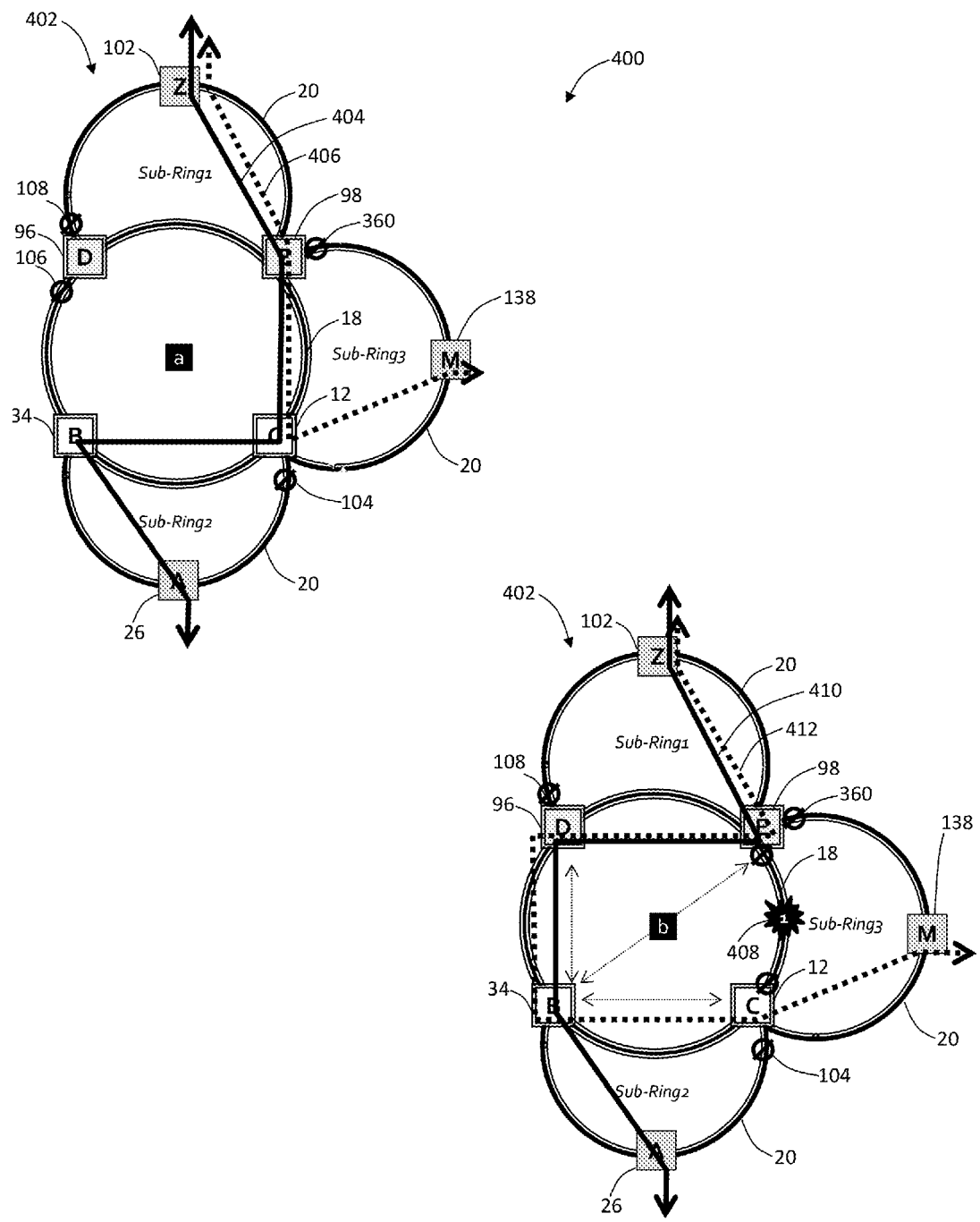
FIGS. 24 and 25 ($a, b, c1, c2$, and $c3$) are network diagrams illustrating a still further exemplary embodiment of the system and method for handling multiple faults and isolated nodes in an interconnected ring network of the present disclosure.
Figure 25:
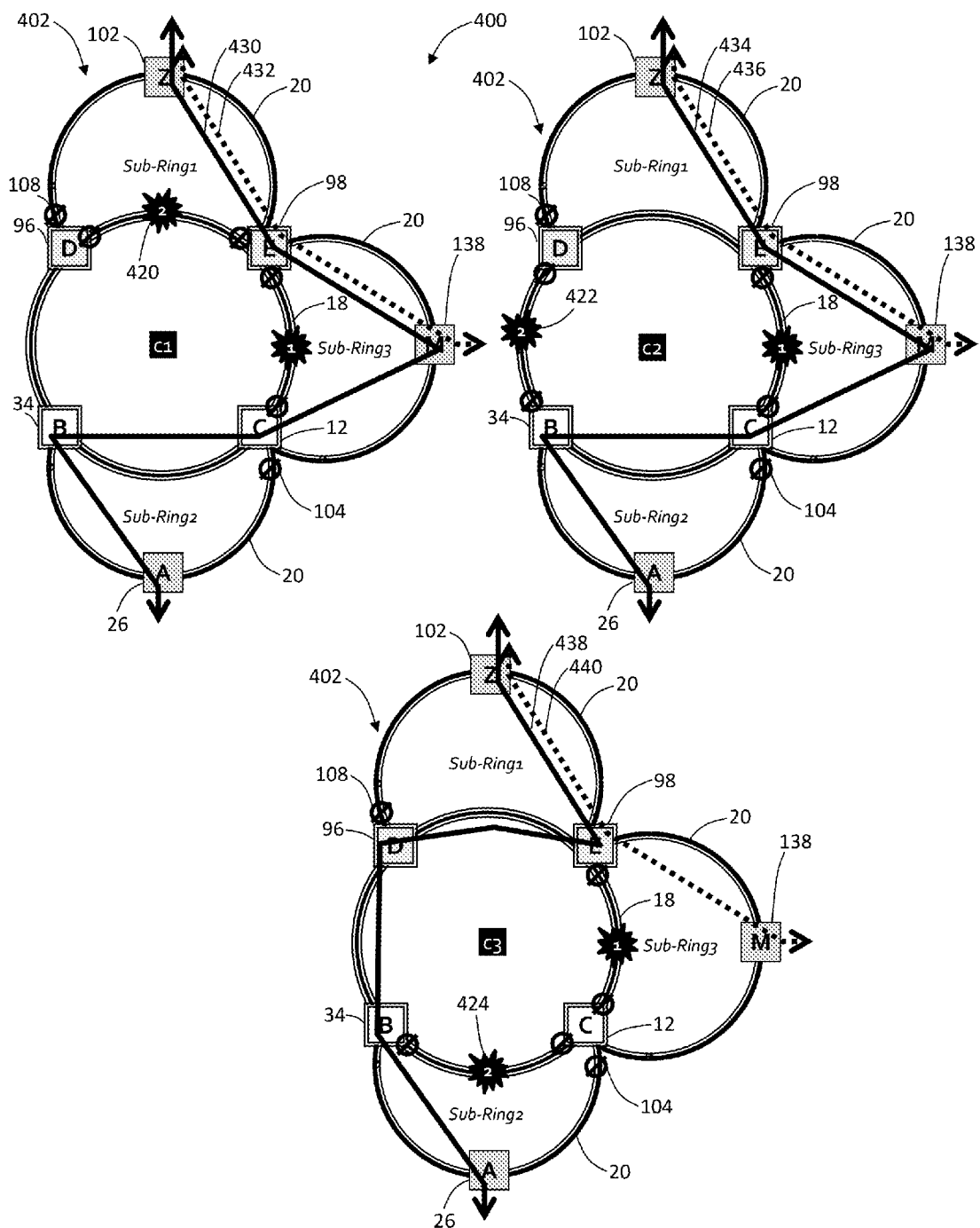

FIGS. 24 and 25 (a, b, c1, c2, and c3) are network diagrams illustrating a still further exemplary embodiment of the system and method 400 for handling multiple faults and isolated nodes in an interconnected ring network 402 of the present disclosure. In general (referring specifically to FIG. 24a), a major ring 18 is interconnected to a trio of sub-rings 20, each by a pair of interconnection nodes, B 34 and C 12, D 96 and E 98, and C 12 and E 98, respectively. Thus, full data path connectivity 404 (through node Z 102-node E 98-node C 12-node B 34-node A 26) and 406 (through node Z 102-node E 98-node C 12-node M 138) is initially supported. There are conventional port blocks 104, 106, 108, and 360 between the major ring 18 and a sub-ring 20 at node C 12, within the major ring 18 at node D 96, between the major ring 18 and a sub-ring 20 also at node D 96, and between the major ring 18 and a sub-ring 20 at node E 98, respectively. Subsequently (referring specifically to FIG. 24b), a fault 408 occurs on the link between nodes C 12 and E 98 in the major ring 18. However, interconnection node connectivity between nodes C 12 and B 34 is maintained, as well as between nodes D 96 and E 98, and between nodes C 12 and E 98. In response, an Ethernet ring protection switching protocol is activated on the major ring 18—thereby maintaining full data path connectivity 410 (through node Z 102-node E 98-node D 96-node B 34-node A 26) and 412 (through node Z 102-node E 98-node D 96-node B 34-node C 12-node M 138). Subsequently (referring specifically to FIGS. 25c1, 25c2, and 25c3), a second fault 420, 422, or 424 occurs on a link in the major ring 18. In the case of fault 420, an Ethernet ring protection switching protocol is again activated on the major ring 18. INC faults between nodes C 12 and E 96, and nodes D 96 and E 98, are detected. However, interconnection nodes C 12 and E 98 do not Rx a CCM with an INC fault indication (containing a sub-ring identifier higher than themselves). Consequently, the INC mechanism is triggered and the channel block 360 is removed from the associated sub-ring 20. Thus, full data path connectivities 430 (through node Z 102-node E 98-node M 138-node C 12-node B 34-node A 26) and 432 (through node Z 102-node E 98-node M 138) are maintained. In the case of fault 422, an Ethernet ring protection switching protocol is again activated on the major ring 18. An INC fault between nodes C 12 and E 98 is detected. However, interconnection nodes C 12 and E 98 do not Rx a CCM with an INC fault indication (containing a sub-ring identifier higher than themselves). Consequently, the INC mechanism is triggered and the channel block 360 is removed from the associated sub-ring 20. Thus, full data path connectivities 434 (through node Z 102-node E 98-node M 138-node C 12-Node B 34-node A 26) and 436 (through node Z 102-node E 98-node M 138) are maintained. In the case of fault 424, an Ethernet ring protection switching protocol is again activated on the major ring 18. INC faults between nodes B 34 and C 1 98, are detected. However, interconnection nodes C 12 and E 98 do not Rx a CCM with an INC fault indication (containing a sub-ring identifier higher than themselves). Consequently, the INC mechanism is triggered and the channel block 360 is removed from the associated sub-ring 20. Thus, full data path connectivities 438 (through node Z 102-node E 98-node D 96-node B 34-node A 26) and 440 (through node Z 102-node E 98-node M 138) are maintained.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A network, comprising:
   a major ring;
   at least one sub-ring;
   a plurality of nodes associated with the major ring and the at least one sub-ring, wherein the plurality of nodes comprise a pair of interconnection nodes that couple the major ring to the at least one sub-ring;
   a detection mechanism for detecting when there is a fault in data path connectivity between the pair of interconnection nodes, wherein the detection mechanism comprises a CCM (continuity check message) session between the pair of interconnection nodes with INC (interconnection node continuity) data included therein; and
   a trigger mechanism for, when the fault is detected, removing a sub-ring channel block in at least one of the interconnection nodes such that end-to-end client traffic connectivity is restored through the major ring and the at least one sub-ring.
2. The network of claim 1, wherein the detection mechanism comprises point-to-multipoint CCMs exchanged between the interconnection nodes.
3. The network of claim 1, wherein the trigger mechanism comprises an Ethernet ring protection switching protocol.
4. The network of claim 1, wherein the trigger mechanism clears a forwarding table of at least one of the interconnection nodes.
5. The network of claim 1, wherein the sub-ring channel block is removed in at least one of the interconnection nodes by the trigger mechanism if: (1) an INC fault is detected, and (2) the interconnection node does not receive a CCM PDU comprising a sub-ring identifier that is not equal to 1 that contains an INC fault status.
6. The network of claim 1, wherein the sub-ring channel block remains/is replaced in at least one of the interconnection nodes by the trigger mechanism if: (1) an INC recovered is detected, or (2) the interconnection node receives a CCM PDU comprising a sub-ring identifier that is not equal to 1 that contains an INC fault status.
7. The network of claim 1, wherein the detection mechanism also detects when there is a prior fault in data path connectivity, thereby resulting in the subsequent fault leaving at least one of the interconnection nodes isolated by faults.

8. A network interconnection node interconnecting a major ring and at least one sub-ring, comprising:
- a plurality of ports coupled to a plurality of other nodes in the major ring and the at least one sub-ring and at least one other interconnection node interconnecting the major ring and the at least one sub-ring;
- a sub-ring channel block on one of the plurality of ports, wherein the sub-ring channel block prevents data traffic from passing between the major ring and the at least one sub-ring over the port;
- a detection mechanism for detecting when there is a fault in data path connectivity between the network interconnection node and the at least one other interconnection node at the coupling port, wherein the detection mechanism comprises a CCM (continuity check message) session between the interconnection nodes with INC (interconnection node continuity) data included therein; and
- a trigger mechanism for, when the fault is detected, removing the sub-ring channel block from the blocked port such that end-to-end client traffic connectivity is restored through the major ring and the at least one sub-ring.

9. The network interconnection node of claim 8, wherein the detection mechanism comprises point-to-multipoint CCMs exchanged between the interconnection nodes.

10. The network interconnection node of claim 8, wherein the trigger mechanism comprises an Ethernet ring protection switching protocol.

11. The network interconnection node of claim 8, wherein the trigger mechanism clears a forwarding table of at least one of the interconnection nodes.

12. The network interconnection node of claim 8, wherein the sub-ring channel block is removed from the blocked port if: (1) an INC fault is detected, and (2) the interconnection node does not receive a CCM PDU comprising a sub-ring identifier that is not equal to 1 that contains an INC fault status.

13. The network interconnection node of claim 8, wherein the sub-ring channel block remains/is replaced at the blocked port if: (1) an INC recovered is detected, or (2) the interconnection node receives a CCM PDU comprising a sub-ring identifier that is not equal to 1 that contains an INC fault status.

14. The network interconnection node of claim 8, wherein the detection mechanism also detects when there is a prior fault in data path connectivity, thereby resulting in the subsequent fault leaving at least one of the interconnection nodes isolated by faults.

15. A network method, comprising:
- utilizing a major ring;
- utilizing at least one sub-ring;
- utilizing a plurality of nodes associated with the major ring and the at least one sub-ring, wherein the plurality of nodes comprise a pair of interconnection nodes that couple the major ring to the at least one sub-ring;
- utilizing a detection mechanism for detecting when there is a fault in data path connectivity between the pair of interconnection nodes, wherein the detection mechanism comprises a CCM (continuity check message) session between the pair of interconnection nodes with INC (interconnection node continuity) data included therein; and
- utilizing a trigger mechanism for, when a fault is detected, removing a sub-ring channel block in at least one of the interconnection nodes such that end-to-end client traffic connectivity is restored through the major ring and the at least one sub-ring.

16. The network method of claim 15, wherein the trigger mechanism clears a forwarding table of at least one of the interconnection nodes.

17. The network method of claim 15, wherein the sub-ring channel block is removed in at least one of the interconnection nodes if: (1) an INC fault is detected, and (2) the interconnection node does not receive a CCM PDU comprising a sub-ring identifier that is not equal to 1 that contains an INC fault status.

18. The network method of claim 15, wherein the sub-ring channel block remains/is replaced in at least one of the interconnection nodes if: (1) an INC recovered is detected, or (2) the interconnection node receives a CCM PDU comprising a sub-ring identifier that is not equal to 1 that contains an INC fault status.

* * * * *